(12) United States Patent
Human

(10) Patent No.: US 6,866,809 B2
(45) Date of Patent: Mar. 15, 2005

(54) PRODUCTION OF MOULDED ARTICLES AND APPARATUS FOR PRODUCING MOULDED ARTICLES

(75) Inventor: Jan Petrus Human, Western Cape (ZA)

(73) Assignee: Lomold Corporation NV, Curacao (NL)

( * ) Notice: Subject to any disclaimer, the term of this patent is extended or adjusted under 35 U.S.C. 154(b) by 149 days.

(21) Appl. No.: 10/208,648

(22) Filed: Jul. 30, 2002

(65) Prior Publication Data

US 2003/0107154 A1 Jun. 12, 2003

Related U.S. Application Data

(63) Continuation of application No. 09/262,706, filed on Mar. 4, 1999, now abandoned, which is a continuation-in-part of application No. PCT/US97/15673, filed on Sep. 5, 1997.

(30) Foreign Application Priority Data

Sep. 5, 1996 (ZA) .............................................. 96/7509
Jun. 4, 1997 (ZA) .............................................. 97/4923

(51) Int. Cl.[7] .......................... B29C 45/52; B29C 45/50
(52) U.S. Cl. .................. 264/328.19; 264/349; 425/562; 425/574
(58) Field of Search ............................... 425/559, 562, 425/557, 566, 564, 571; 264/328.19, 349

(56) References Cited

U.S. PATENT DOCUMENTS

| | | | |
|---|---|---|---|
| 1,460,287 A | 6/1923 | Stevenson .................... | 425/258 |
| 2,469,342 A | 5/1949 | Richardson | |
| 2,479,383 A | 8/1949 | MacMillin .................. | 425/258 |
| 2,621,363 A | 12/1952 | Fienberg et al. | |
| 2,704,380 A | 12/1955 | Cuzzi .......................... | 425/565 |
| 3,001,233 A * | 9/1961 | Ernst .......................... | 425/145 |
| 3,075,286 A | 1/1963 | McVicker et al. .......... | 425/156 |
| 3,196,198 A | 7/1965 | Rex | |
| 3,650,654 A * | 3/1972 | Schwartz ..................... | 425/550 |

(List continued on next page.)

FOREIGN PATENT DOCUMENTS

| | | |
|---|---|---|
| DE | 1253567 | 11/1967 |
| DE | 1926032 | 11/1970 |
| DE | 1729252 | 6/1971 |

(List continued on next page.)

OTHER PUBLICATIONS

Partial English Translation of EP0510414 dated Oct. 28, 1992.
Patent Abstracts of Japan of JP 57087340 dated May 31, 1982.
Patent Abstracts of Japan of JP 63216720 dated Sep. 9, 1988.
Partial English Translation of DE 1926032 dated Nov. 26, 1970.
Derwent Abstract of SU 1231542 dated May 15, 1986.
Abstract of SU 551123 dated Jun. 23, 1997.

Primary Examiner—Robert B. Davis
(74) Attorney, Agent, or Firm—Ladas & Parry LLP

(57) ABSTRACT

Moulding apparatus is disclosed which comprises transfer element (12) which has a holding cavity (14) therein for receiving a charge of mouldable material. Mouldable material in particulate or molten form is fed into a heated passage (30) by a feed spiral (40) in a tube (36). A plunger (42) displaces molten mouldable material along the passage (30) and into the holding cavity (14). The transfer element (12) is then displaced to a position in which the holding cavity (14) is aligned with an opening (18) in a backing plate (16). The opening (18) is in communication with a mould cavity (20) having the shape of the article to be produced. A second plunger (46) displaces the charge of molten mouldable material from the holding cavity (14) through the opening (18) and into the mould cavity.

13 Claims, 21 Drawing Sheets

U.S. PATENT DOCUMENTS

| | | | | |
|---|---|---|---|---|
| 4,908,169 A | * | 3/1990 | Galic et al. | 264/410 |
| 5,370,518 A | * | 12/1994 | Sasaki et al. | 425/147 |
| 6,200,126 B1 | * | 3/2001 | Lohl | 425/557 |
| 2003/0102599 A1 | * | 6/2003 | Du Toit | 264/297.8 |

FOREIGN PATENT DOCUMENTS

| | | | | |
|---|---|---|---|---|
| DE | 1778412 | 9/1971 | | |
| DE | 3833547 | 4/1990 | | |
| EP | 0510414 | 10/1992 | | |
| FR | 2214576 | 8/1974 | | |
| FR | 2225271 | 11/1974 | | |
| JP | 09225977 A | * 9/1997 | | B29C/45/52 |
| SU | 551123 | 6/1977 | | |
| SU | 1231542 | 5/1986 | | |
| WO | 92/12839 | 8/1992 | | |

\* cited by examiner

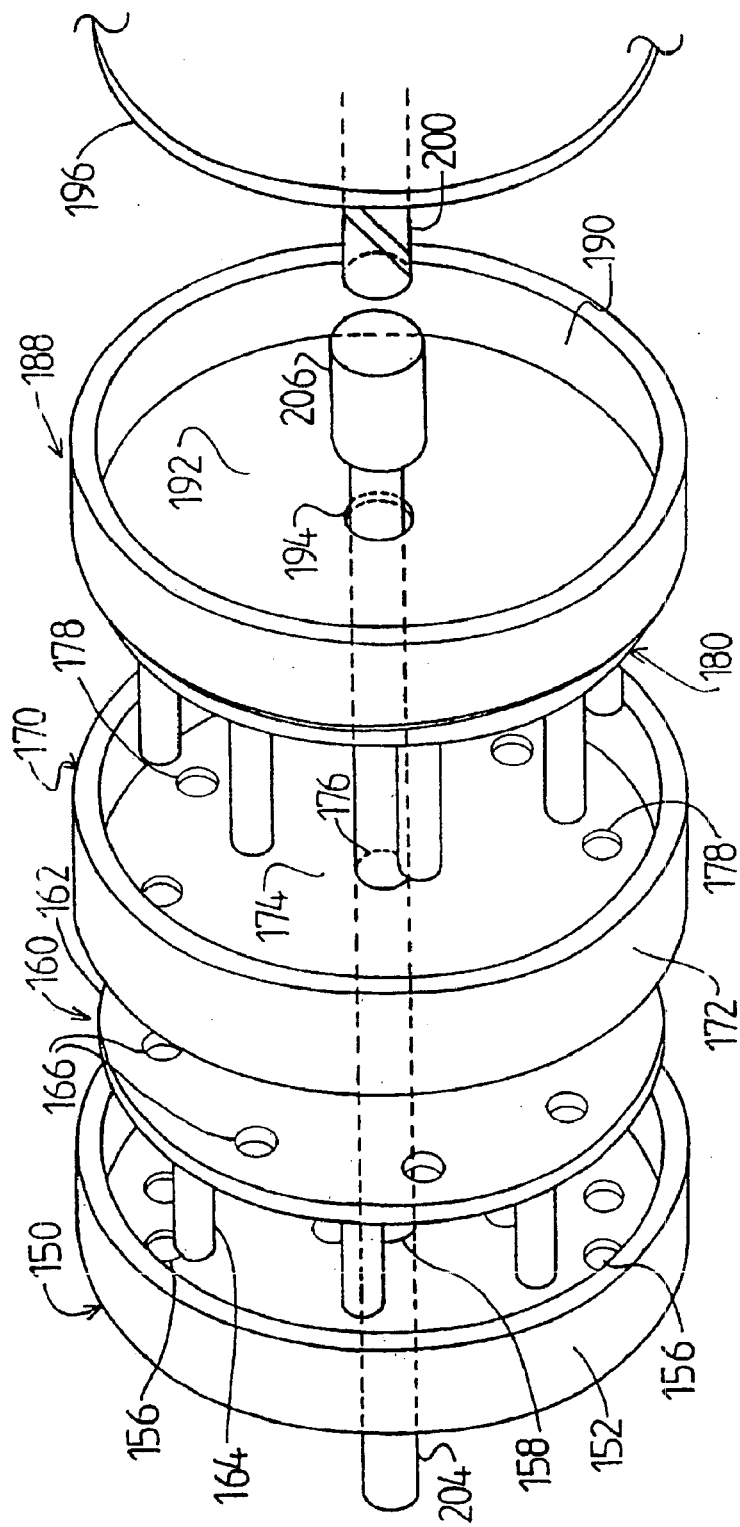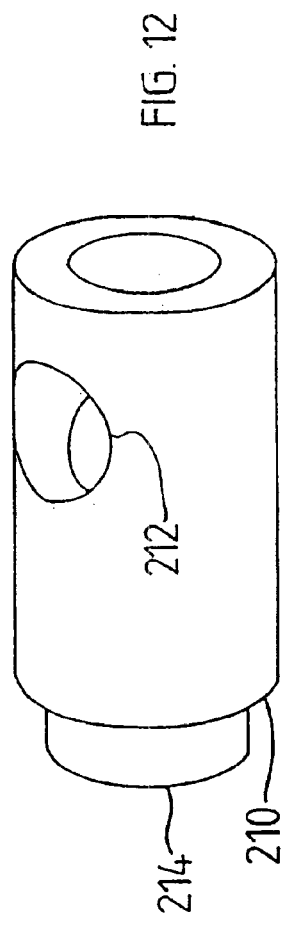
FIG. 11
FIG. 12

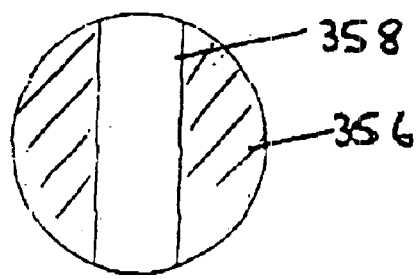
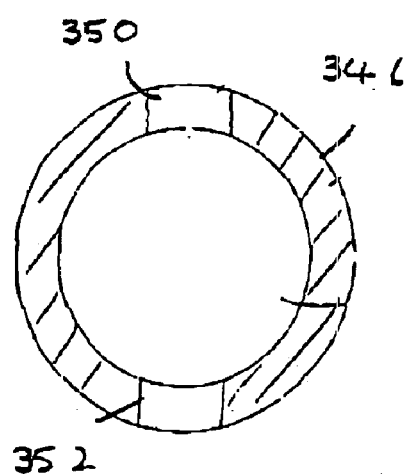
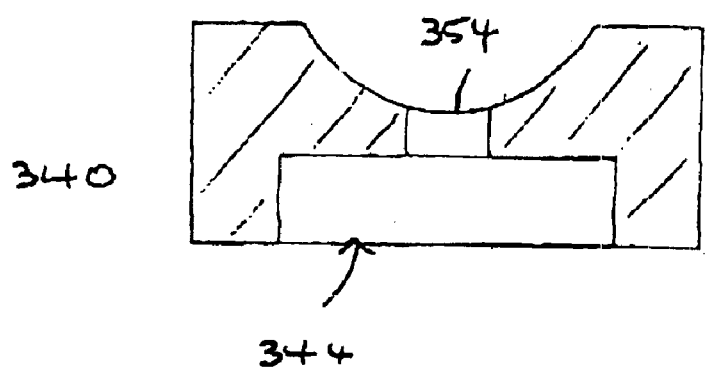
Fig. 18

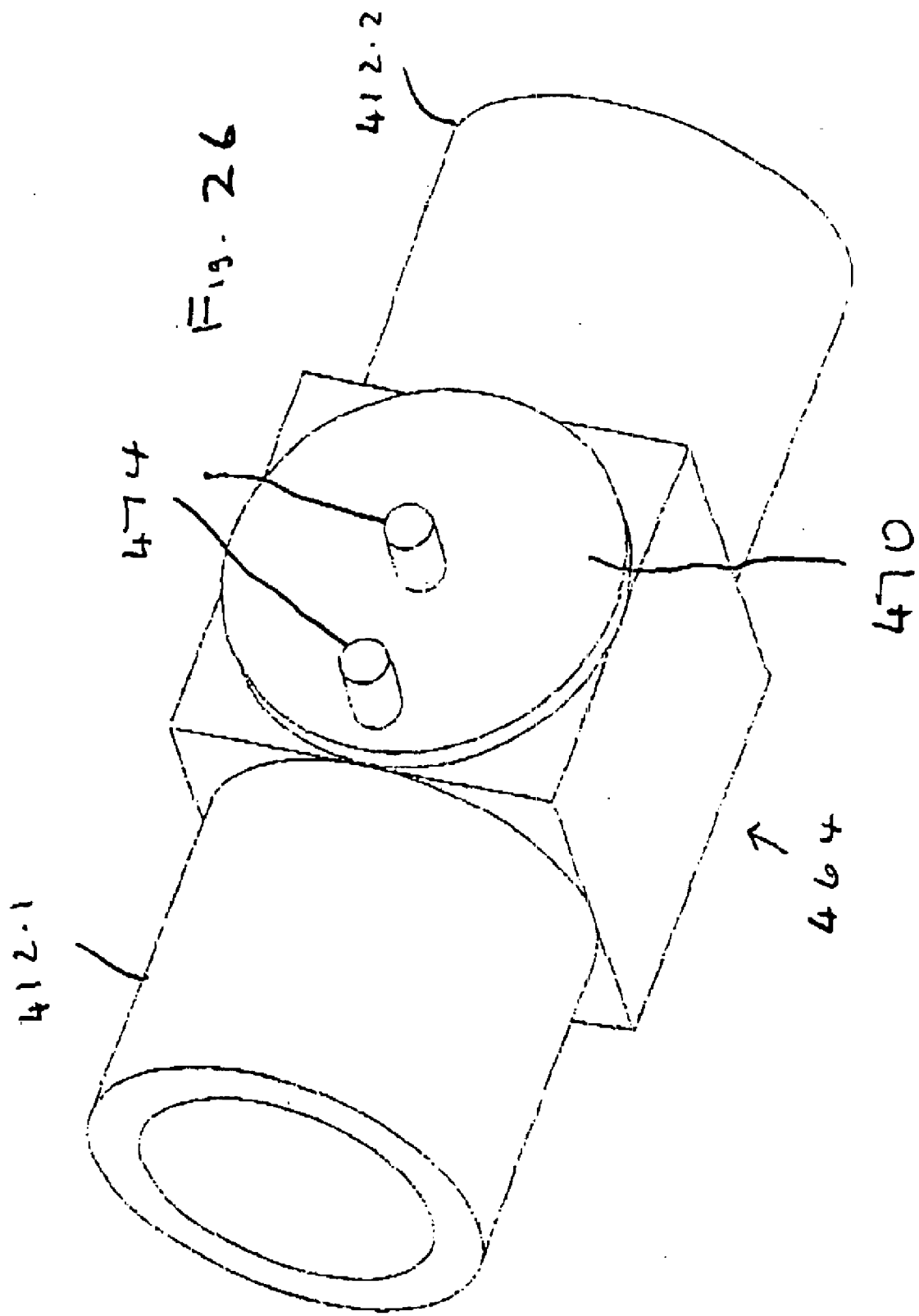

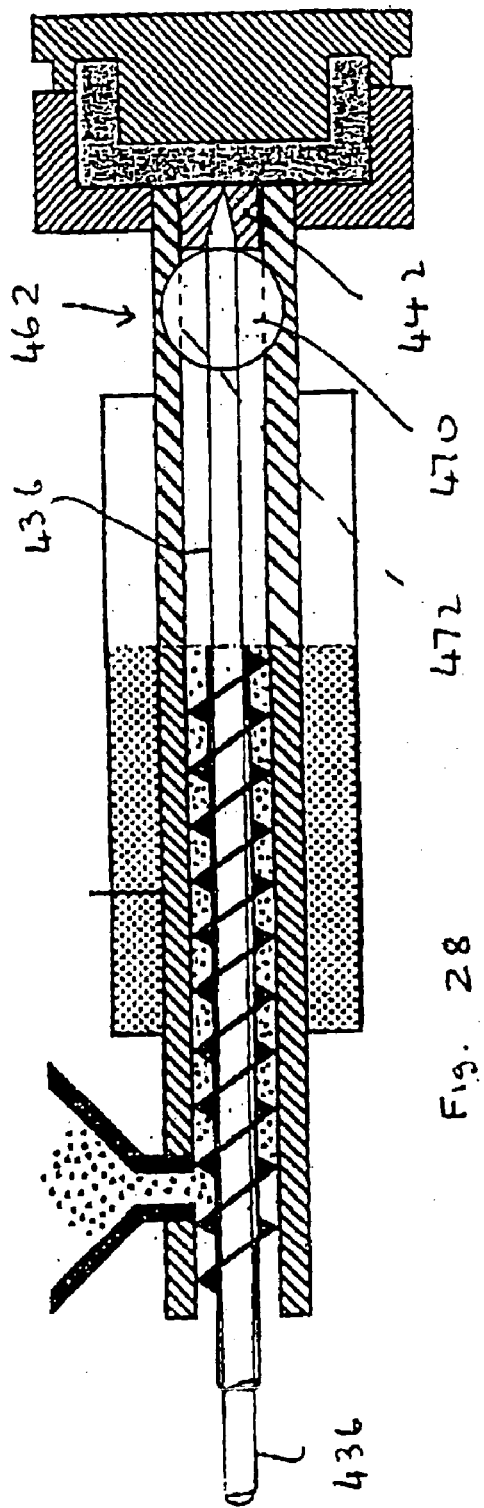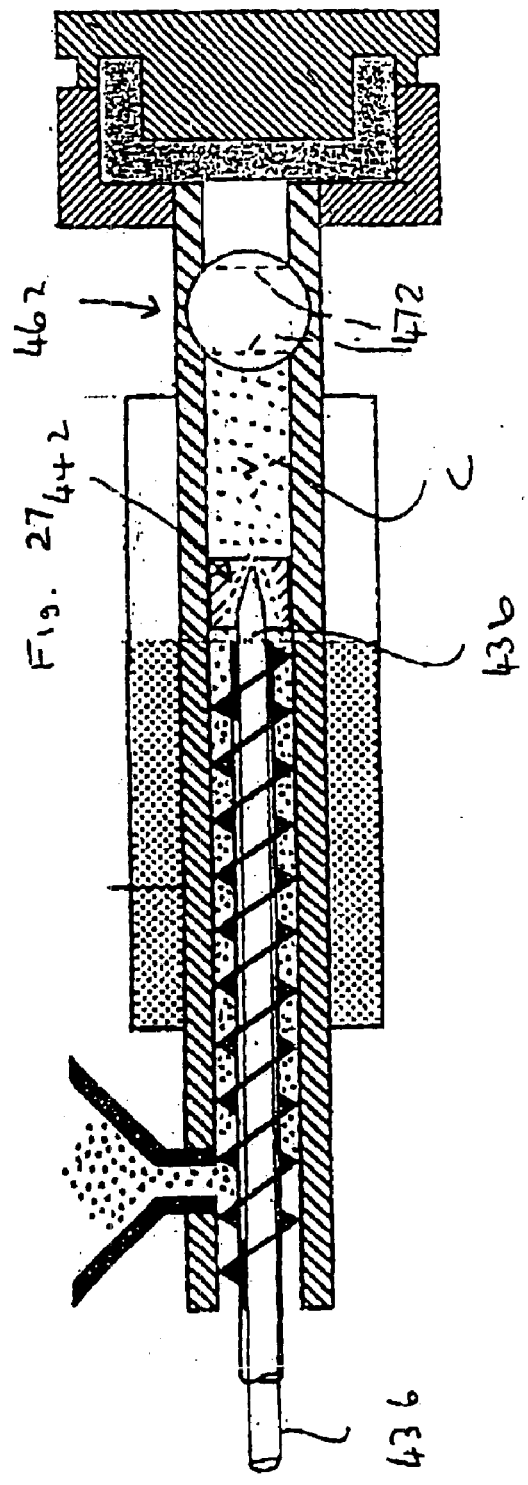

PRODUCTION OF MOULDED ARTICLES AND APPARATUS FOR PRODUCING MOULDED ARTICLES

This application is a continuation of application Ser. No. 09/262,706, filed Mar. 4, 1999, now abandoned, which is a continuation-in-part of PCT/US97/15673, filed Sep. 5, 1997.

FIELD OF THE INVENTION

THIS INVENTION relates to the production of moulded articles and to apparatus for producing moulded articles.

BACKGROUND TO THE INVENTION

A number of different techniques are in commercial use and by means of which articles are manufactured using synthetic plastics materials.

The most common technique is that of injection moulding. Injection moulding is capable of producing intricate articles. Because of the high pressure which is required, an injection moulding machine must be of very substantial strength. Likewise, the moulds that are used must also be capable of withstanding high internal pressures.

A form of moulding which does not require such high pressure is known as compression moulding. In this method a shot of molten synthetic plastics material is fed into the cavity of a female mould part. A male mould part is then pressed into the female mould part, the volume of the cavity decreases and the synthetic plastics material is forced to take-up the shape of the space remaining between the two mould parts. The pressure generated in the cavity is lower than that used in injection moulding. The technique is widely used for products such as bottle caps where short cycle times and high production volumes are required. This technique is limited insofar as the shapes that it can produce are concerned. For example, it cannot make components with undercuts.

If a component is to have a constant cross section throughout then it can be extruded. Extrusion involves the use of a die through which the molten synthetic plastics material is forced. This technique can, of course, only be used where the article is of constant cross section throughout. It is thus used for producing tubes, strips and bars.

A further known technique is thermoforming. This technique involves placing a heated and hence softened sheet of synthetic plastics material between two moulds and then closing the moulds to conform the sheet to the shape of the moulds. In some versions of this technique vacuum is applied to the underside of the sheet to assist in drawing it down into the lower mould.

There is a need in the plastics industry for a technique which, whilst being able to mould all the shapes that can be achieved by injection moulding, has the ability quickly to produce articles in larger numbers and/or of larger size than injection moulding can.

Increasing use is being made in industry of ceramics, of sintered metal and of composite materials filled with carbon and glass fibres and the present invention seeks to provide a new method of producing components using these materials. Injection moulding is not a method that can be used with filled plastics as the fibres can block the so-called pin gates through which the material flows into the mould.

A current method of making components from ceramics uses an injection moulding procedure but this procedure can only make small components.

BRIEF DESCRIPTION OF THE INVENTION

According to one aspect of the present invention there is provided moulding apparatus comprising a transfer element bounding a holding cavity for mouldable material, a passage leading to said holding cavity, means for displacing mouldable material along said passage and into said holding cavity whilst said transfer element is in a first position, means for displacing said transfer element between said first position and a second position, and a plunger for urging said mouldable material out of said holding cavity and into a moulding cavity whilst said transfer element is in its second position.

The apparatus preferably includes heating means for heating said holding cavity and also means for heating said passage.

The mouldable material can be supplied in molten form to said passage. However, it is preferred that the apparatus include means for supplying mouldable material in particulate form to said passage, and that the material be melted in the passage.

In one form the apparatus includes means for reciprocating said transfer element along a rectilinear path between said first and second positions. In this form said transfer element can have at least one bore therein for receiving a reciprocable pin which has a camming surface that is skew to the direction in which the pin reciprocates, said surface bearing on said transfer element as the pin is inserted into the bore to cam said transfer element in one direction between said positions, and means for displacing said transfer element in the other direction between said positions as the pin is withdrawn from said bore.

In another form of apparatus said transfer element is a shaft having a transverse bore forming said holding cavity, said shaft being within a sleeve having first, second and third circumferentially spaced openings in the walling thereof, the first of said openings forming part of said passage, the second of said openings in use placing the holding cavity in communication with a mould cavity and said third opening permitting said plunger to enter said holding cavity, the second and third openings being diametrically opposed, said sleeve closing-off said holding cavity on the opposite side thereof to said first opening when said shaft is in its first position, and means for turning said shaft to displace it between said first position in which the first opening is in communication with the holding cavity and said second position in which said holding cavity is aligned with said second and third openings.

To enable the mouldable material to remain in the passage for a sufficient time to melt, the volume of said passage can exceed the volume of said holding cavity whereby the passage can contain a sufficient volume of mouldable material to fill the holding cavity a number of times.

Preferably the moulding apparatus includes a plurality of holding cavities in said transfer element, a plurality of passages, a plurality of means for displacing mouldable material along said passages and into said holding cavities, and a plurality of plungers for urging mouldable material out of said holding cavities and into one moulding cavity or into a plurality of moulding cavities. In this form the holding cavities can be of different volumes.

In a specific form of moulding apparatus said transfer element is constituted by a disc mounted for turning about its centre and having a plurality of holding cavities therein, there being a first plurality of reciprocable plungers constituting said means for moving mouldable material along the passages and into said holding cavities whilst said disc is in said first position, and a second plurality of reciprocable plungers for urging said mouldable material out of said holding cavities and into one moulding cavity or into a plurality of moulding cavities.

According to a further aspect of the present invention there is provided a method of moulding which comprises displacing mouldable material into a holding cavity whilst the holding cavity is in a first position, moving said holding cavity from said first position to a second position, and discharging the mouldable material from the holding cavity into a mould cavity whilst the holding cavity is in said second position.

The method can include the steps of moving a first plunger in a forward stoke along a passage to displace said mouldable material from said passage into said holding cavity, moving the holding cavity to said second position, moving said first plunger in a return stroke, displacing a second plunger in a forward stroke to discharge mouldable material from said holding cavity into said mould cavity, moving said second plunger in a return stroke, and moving the holding cavity back to its first position.

Preferably mouldable material is fed into said passage after said first plunger has performed its return stroke. The mouldable material is preferably fed to said passage in particulate form and the method includes the step of heating the mouldable material in said passage. It is also desirable to heat the mouldable material in said holding cavity.

Preferably the method includes displacing mouldable material into a plurality of holding cavities, and discharging said mouldable material from said holding cavities into one moulding cavity or into a plurality of moulding cavities.

According to a still further aspect of the present invention there is provided a method of moulding in which mouldable material is fed to a holding cavity to fill the holding cavity, a forward end of the holding cavity being bounded by a valve structure and the holding cavity being filled through a rearward end thereof, opening said valve structure after the cavity has been filled and advancing a plunger through the holding cavity and through the valve structure to a forward position so that said front face of the plunger displaces said mouldable material out of the holding cavity and into a moulding cavity, said front face of said plunger becoming part of the bounding wall of the moulding cavity upon the plunger reaching its forward position.

According to another aspect of the present invention there is provided moulding apparatus comprising a first component having a holding cavity therein, means for feeding mouldable material to the holding cavity to fill the holding cavity, a forward end of the holding cavity being closed-off by a second component of the apparatus and the holding cavity being filled through a rearward end thereof, means for displacing said second component of the apparatus relatively to the first component so as to open said forward end of the holding cavity, a moulding cavity, displacement of said second component placing said forward end of said holding cavity in communication with said moulding cavity, a plunger having a front face, and means for advancing said plunger through the holding cavity to a forward position so that its front face forces mouldable material out of said holding cavity and into the moulding cavity, said front face of the plunger becoming part of the bounding wall of the moulding cavity when the plunger is in its forward position.

In one form said first component is a fixed cylinder with a transverse bore which forms said holding cavity, and said second component is a sleeve which is displaceable with respect to the first component. Said sleeve can slide axially or rotate with respect to the cylinder to place the forward end of the holding cavity in communication with said moulding cavity. In another form said first component is a fixed plate which has a bore therethrough constituting the holding cavity, said fixed plate being between two further plates which can be reciprocated linearly. Said further plates can be two separate plates or constituted by two parts of a single component which has an internal recess which receives said fixed plate.

According to a still further aspect of the present invention there is provided moulding apparatus comprising a barrel, shut-off means in the barrel and having a first position in which it blocks the barrel and prevents flow of material along the barrel and a second position in which feed of material along the barrel is permitted, a piston in the barrel, means for feeding mouldable material past the piston and into a charge measuring chamber between said shut-off means and said piston, and means for advancing said piston so that it displaces a charge of mouldable material in said chamber past the shut-off means.

According to yet another aspect of the present invention there is provided a method of moulding which comprises feeding mouldable material to a chamber in a barrel, the chamber being bounded on one side by a piston and on the other side by means which has an open condition and a closed condition, and moving the piston along the barrel past said means, whilst said means is in its open condition, thereby to displace a charge of material which was previously in said chamber into a mould cavity.

In one form the charge moves past the piston through passages in the piston. In another form the piston is collapsible and the charge moves past the piston between the piston and the barrel.

BRIEF DESCRIPTION OF THE DRAWINGS

For a better understanding of the present invention, and to show how the same may be carried into effect, reference will now be made, by way of example, to the accompanying drawings in which:

FIG. 11 is a further exploded view of the hydraulically operated mechanism;

FIG. 12 is a pictorial view of part of a material feed system;

FIG. 18 is an exploded end view showing some of the components of the apparatus of FIGS. 16 and 17;

FIG. 26 shows the parts of FIG. 25 when assembled; and

FIGS. 27 and 28 are longitudinal sections showing the apparatus in different operative conditions.

DETAILED DESCRIPTION OF THE DRAWINGS

Figure 1:
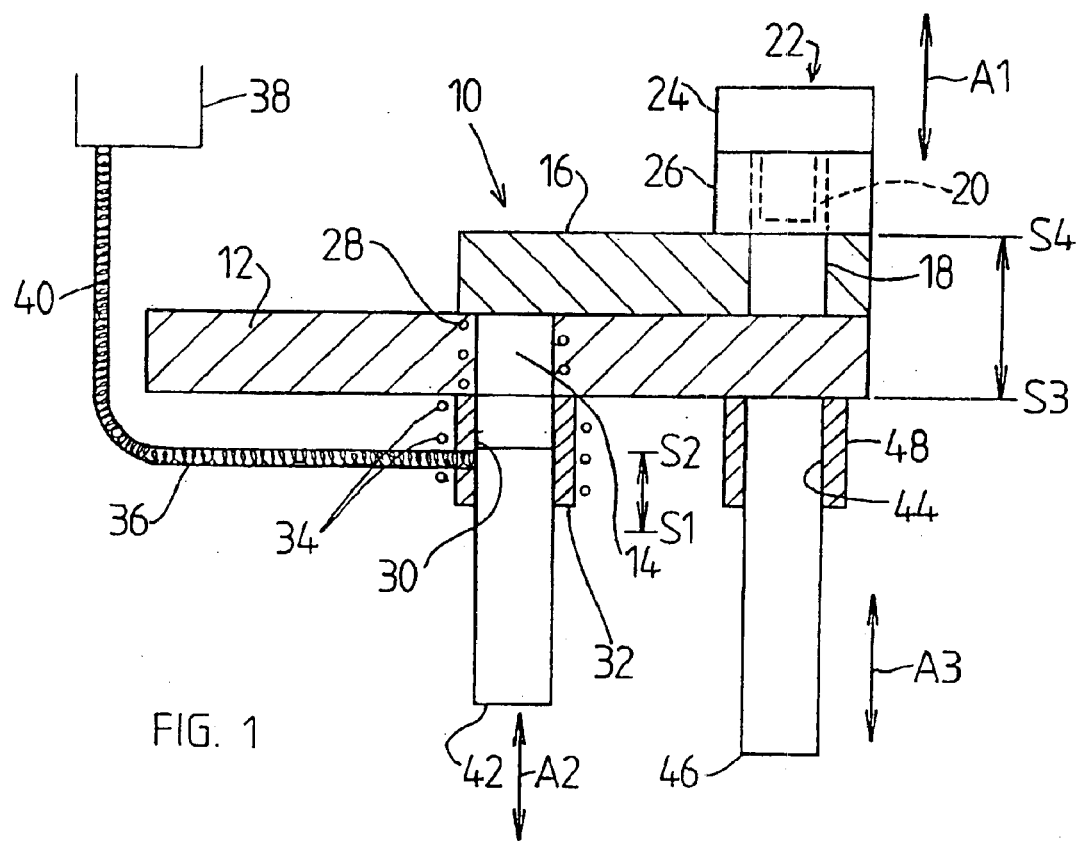
FIGS. 1 and 2 diagrammatically illustrate the operation of a first form of moulding apparatus in accordance with the present invention.

Referring firstly to FIG. 1, the apparatus 10 illustrated comprises a transfer element which is in the form of a plate 12 with a holding cavity 14 in it. The apparatus further includes a backing element which is in the form of a plate 16 having an opening 18 therein. The opening 18 leads into a mould cavity 20 bounded by a mould 22 having a male mould part 24 and a female mould part 26. The female mould part 26 is fixed to the plate 16 and the male mould part 24 is displaceable between mould open and mould closed positions as indicated by the double headed arrow A1.

Embedded in the plate 12 are heating elements 28 which heat the holding cavity 14. The cavity 14 is in communication with a passage 30 constituted by a sleeve 32 which is surrounded by heating elements 34. A tube 36 leads from an overhead hopper 38 to the passage 30, there being a spiral 40 in the tube 36. In use the spiral 40 is rotated so as to feed mouldable material in particulate form from the hopper 38 to the passage 30. The elements 34 melt the mouldable material and the elements 28 ensure that it remains in molten form whilst in the holding cavity 14.

A plunger 42 is displaceable in forward and return strokes as shown by the double headed arrow A2. The length of the plunger's stroke is shown between lines S1 and S2. When the front face of the plunger has moved back to S1, particulate material is fed into the passage 30. As the front face of the plunger moves from S1 to S2, a charge of mouldable material is moved along the passage 30 and into the holding cavity 14.

The apparatus further includes a second passage 44 along which a second plunger 46 moves as shown by the double headed arrow A3. The stroke of the plunger 46 is shown between the lines S3 and S4. The passage 44 is constituted by a fixed sleeve 48.

The means for reciprocating the plungers can be hydraulic cylinders or pneumatic cylinders rotatable cams or cams which reciprocate and have inclined cam faces.

The sleeves 32 and 48, the plate 16 and the female mould part 22 are fixed and carried by a frame (not shown) of the apparatus.

In the position shown in FIG. 1 the plunger 42 is shown in its forward position in which it has moved a charge of mouldable material along the passage 30 and into the holding cavity 14. The force exerted by the plunger 42 is sufficient to pack the holding cavity 14 with molten mouldable material and expel all the air therefrom.

The plunger 46 is in its retracted position at S3. In this position its front face is just clear of the face of the plate 12.

The mould parts 24 and 26 are urged against one another to form the mould cavity 20.

Figure 2:
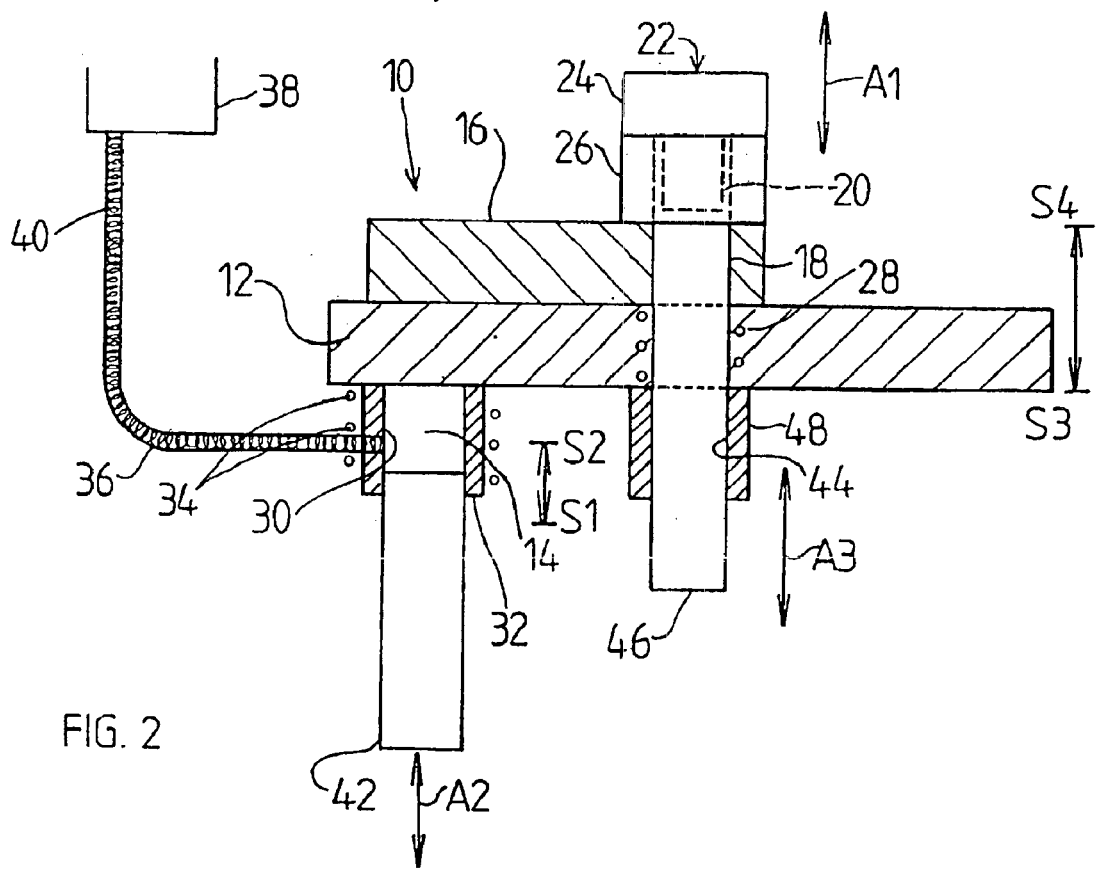

The plate 12 is then displaced to the right from the position shown in FIG. 1 to the position shown in FIG. 2. The holding cavity 14 moves from the position in which it is aligned with the passage 30 to a position in which it is aligned with the passage 44. The portion of the plate 12 to the left of the cavity 14 closes-off the outlet end of the passage 30. The plunger 42 retracts to the position S1 after the passage 30 has been blocked-off by the plate 12 and the spiral 40 feeds mouldable material along the tube 36 and into the passage 30. The heating elements 34 melt the mouldable material in the passage. This material is preferably a synthetic plastics in particulate form.

Immediately the holding cavity 14 is aligned with the passage 44 and opening 18, the plunger 46 moves in its forward stroke to urge the charge of mouldable material out of the holding cavity 14, through the opening 18 and into the mould cavity 20. The front face of the plunger 42 stops at S4 and forms part of the bounding wall of the cavity 20.

Once the charge of material has solidified in the mould cavity 20, the plunger 46 retracts to the position shown at S3 and the mould parts separate. The plate 12 returns to the position shown in FIG. 1 and thereafter the plunger 42 advances so as to re-charge the holding cavity 14 with molten mouldable material and thus start the next cycle.

The passage 30 is of sufficient length to contain, for example, sufficient mouldable material to fill the holding cavity about thirty times. This ensures that the mouldable material is in the passage long enough to melt. There can also be mixing and plastification devices in the passage as well as venting means for ensuring that the mouldable material which reaches the holding cavity has been mixed homogeneously and is vapour free. Such devices are well known in the injection moulding art and will not be described in more detail herein.

Figure 3:
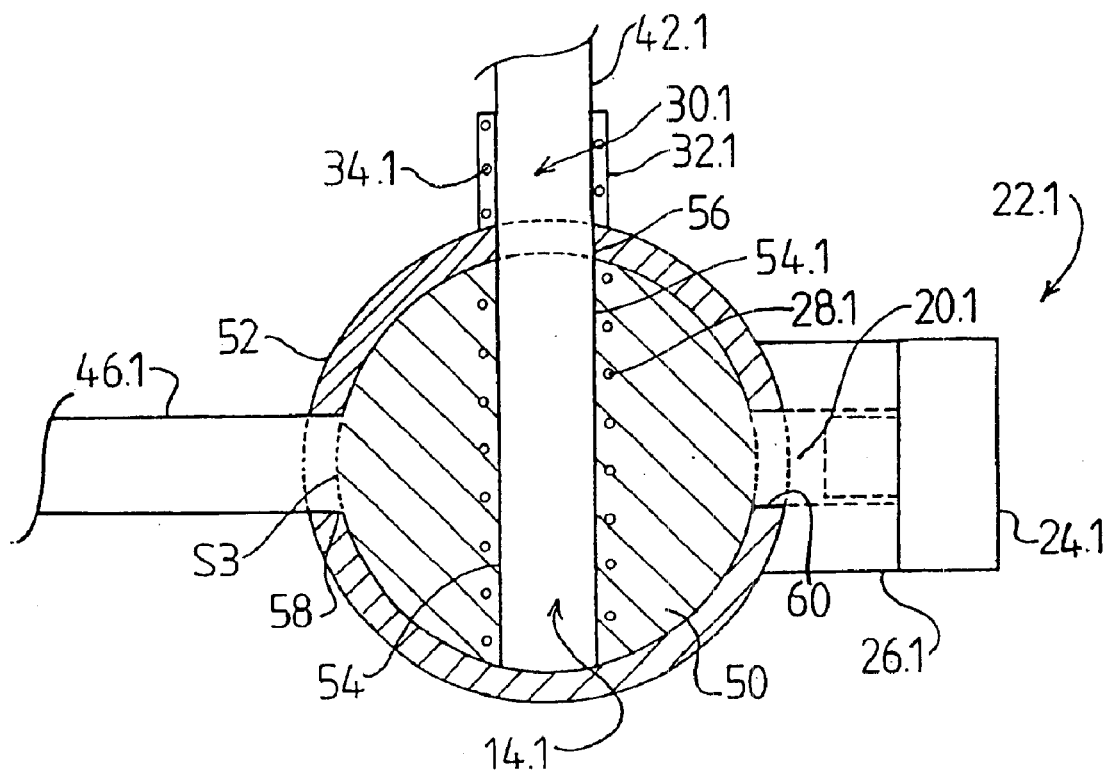
FIGS. 3 and 4 illustrate the operation of a second form of apparatus in accordance with the present invention.
Figure 4:
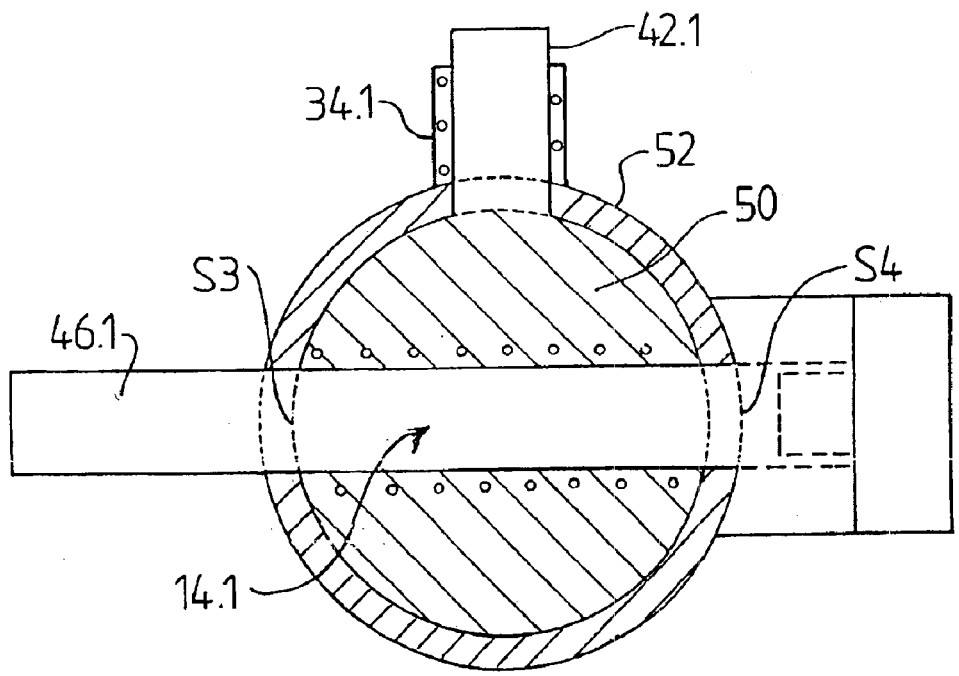

In the moulding apparatus of FIGS. 3 and 4 the transfer plate is in the form of a rotatable shaft 50 and the backing plate is in the form of a sleeve 52. The shaft 50 has a transverse bore 54 which forms the holding cavity 14.1. The shaft 50 is within the sleeve 52 and the sleeve has three circumferentially spaced openings 56, 58 and 60. In the illustrated form the openings 58 and 60 are diametrically opposed and at right angles to the opening 56.

Further components which are illustrated in FIGS. 3 and 4 and which are equivalent to components in FIGS. 1 and 2 have been designated with the same reference numerals plus the suffix ".1".

The plunger 42.1 forces molten mouldable material along the passage 30.1 and into the bore 54.

As soon as the holding cavity constituted by the bore 54 is packed with mouldable material, the shaft 50 is rotated through 90 degrees. This aligns the bore 54 with the openings 58 and 60, the plunger 46.1 then being advanced from its retracted position at S3 to its forward position at S4 thus displacing the charge into the mould cavity. The plunger 46.1 withdraws as soon as the plastics material in the mould has solidified, the shaft 50 is rotated back to its starting position and the cycle is repeated. It is understood that FIGS. 3 and 4 are only illustrative and that the volume of the bore 54 is greatly exaggerated in relation to the capacity of the mould cavity 20.

Figure 5:
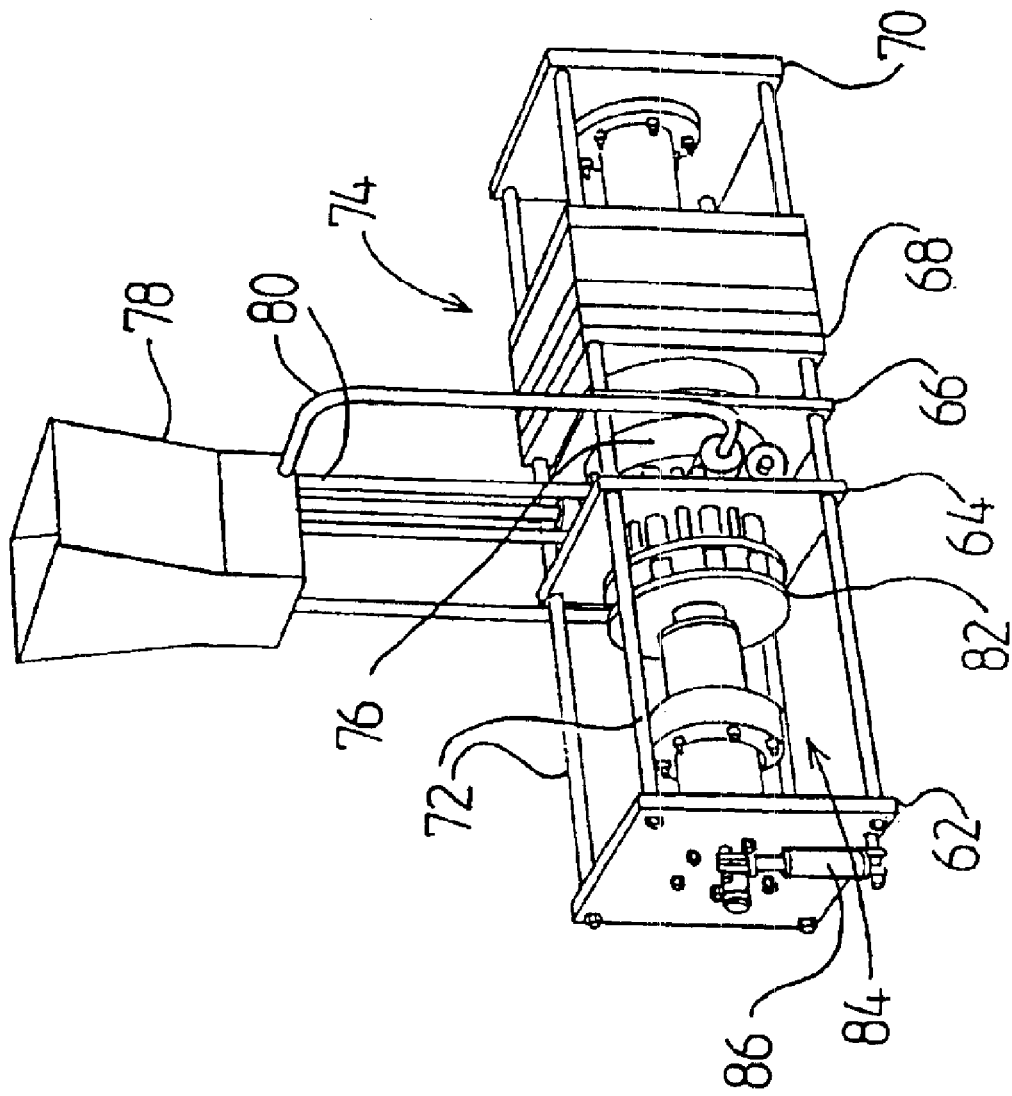
FIG. 5 is a diagrammatic pictorial view of moulding apparatus in accordance with the present invention.

The moulding apparatus shown in FIG. 5 comprises a series of plates 62, 64, 66, 68 and 70 which are held together by rods 72 which act both as tie rods and guide rods. The plates are shown more widely spaced than they actually are to reveal more of the construction. The rods 72 pass through the plates close to the corners thereof. A structure generally designated 74 is mounted on the plate 68. The plate 66 carries a structure 76 which melts the synthetic plastics material to be moulded, the material reaching the structure 76 from an overhead hopper 78 by way of a number of tubes 80. Only five tubes 80 are shown. However, in this form of apparatus there are eight tubes 80.

The structure 82 feeds molten plastics material from the structure 76 to the structure 74. An operating mechanism for the structure 82 is designated 84.

A cylinder 86 mounted on the plate 62 serves to rotate one of the components of the structure 74, and the moulds into which the molten synthetic plastics material is forced are mounted on that side of the plate 70 which is hidden in FIG. 5.

The structure 74 (see FIGS. 6 and 7) comprises front and rear steel plates 86 and 88, front and rear intermediate steel plates 90 and 92, and a rotatable disc 94. The plates 90 and 92 and disc 94 can be of "Teflon" (polytetrafluoroethylene) or another synthetic plastics material such as "PEEK" (polyetheretherketone) or a metal or an alloy with a low co-efficient of friction.

The rear plate 88 has a central hole 96 in it and a ring of sixteen through bores 98. It also has openings 100 through which studs can be passed. The front plate 86 has a ring of eight through bores 102 and openings 104 for receiving studs.

The intermediate plate 92 has a ring of sixteen through bores 106, each bore being co-axial with a hollow boss 108. There is a recess 110 in the face of the plate 92, the depth of this recess being half the thickness of the disc 94. A central hole 112 is also provided in the plate 92.

The plate 90 also has a ring of through bores 114 but this ring of bores comprises only eight bores. Bosses 116 protrude from that face of the plate 90 which lies adjacent the plate 86 and are co-axial with the bores 114. A recess 118 (FIG. 8) similar to the recess 110 in the plate 92 is provided in the face of the plate 90 opposite to that from which the bosses 116 project.

The disc 94 has a ring of sixteen bores 120 and also has a central non-circular central bore 122.

The plates 86 and 88 have recesses 124 and 126.

Figure 6:
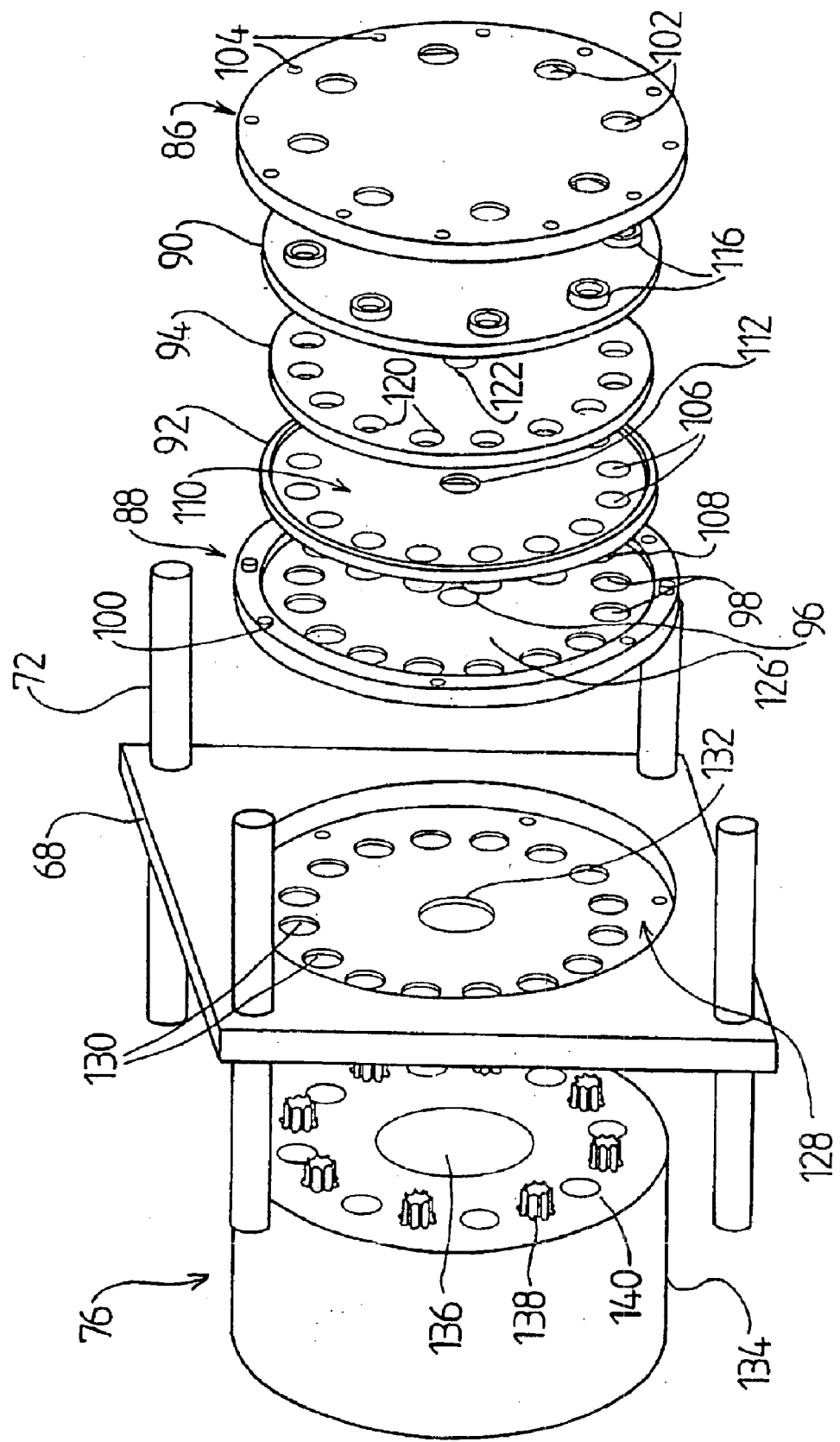
FIG. 6 shows components of one of the structures of the apparatus of FIG. 5.
Figure 7:
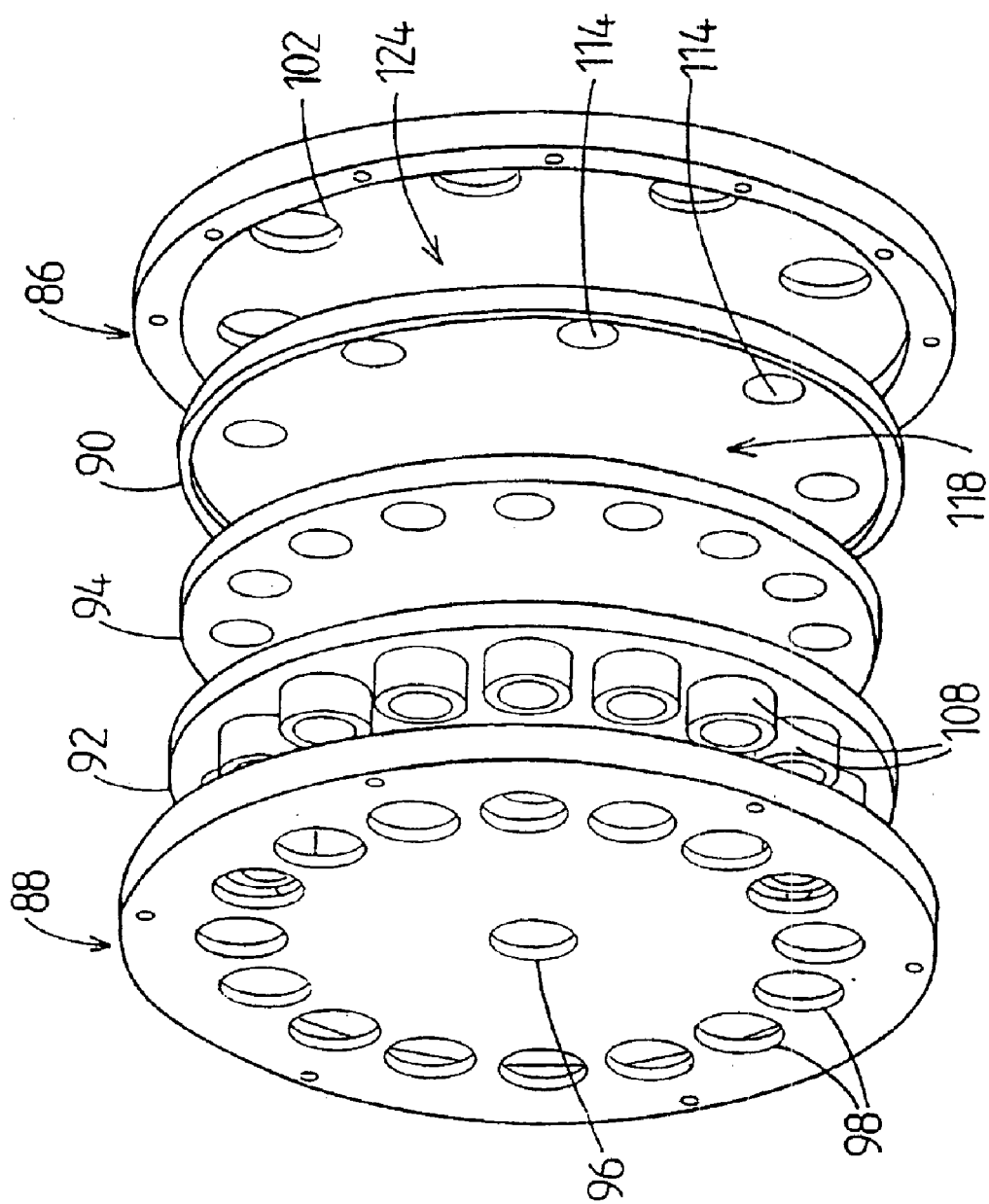
FIG. 7 shows some of the components of FIG. 6 viewed from the other side.

The structure of FIGS. 6 and 7 is assembled by placing the intermediate plate 92 in the recess 126 of the plate 88 so that the bosses 108 pass through the bores 98. The bosses 108 project from the bores 98 on the opposite side of the plate 88 to that on which the plate 92 is positioned. The disc 94 is then inserted into the recess 110 of the plate 92. At this stage half the thickness of the disc 94 projects from the recess 110. The plates 86 and 90 are assembled in the same way as the plates 88 and 92, the bosses 116 passing through the bores 102 and projecting therefrom. Studs, which can either be separate elements or can be fixed to various plates, are passed through the openings 100 and 104 to clamp the plates 86 and 88 together with the plates 90 and 92 and disc 94 between them. The portions of the plates 90 and 92 which encircle the recesses provided therefor in the disc 94 form rims which abut one another and the disc 94 is free to rotate in the cavity provided therefor by the recesses 110 and 118.

The entire structure 74 is then pressed into the recess 128 in the plate 68. As seen in FIG. 6, the plate 68 has an array of sixteen through bores 130 which receive the bosses 108. The plate 68 also has a central opening 132.

The structure 76 (FIGS. 8 and 9) is in the form of a cylindrical metal block 134 having a central hole 136 and a ring of eight larger diameter through bores 138 and eight smaller diameter through bores 140. The bores 138 and 140 alternate with one another.

Figure 8:
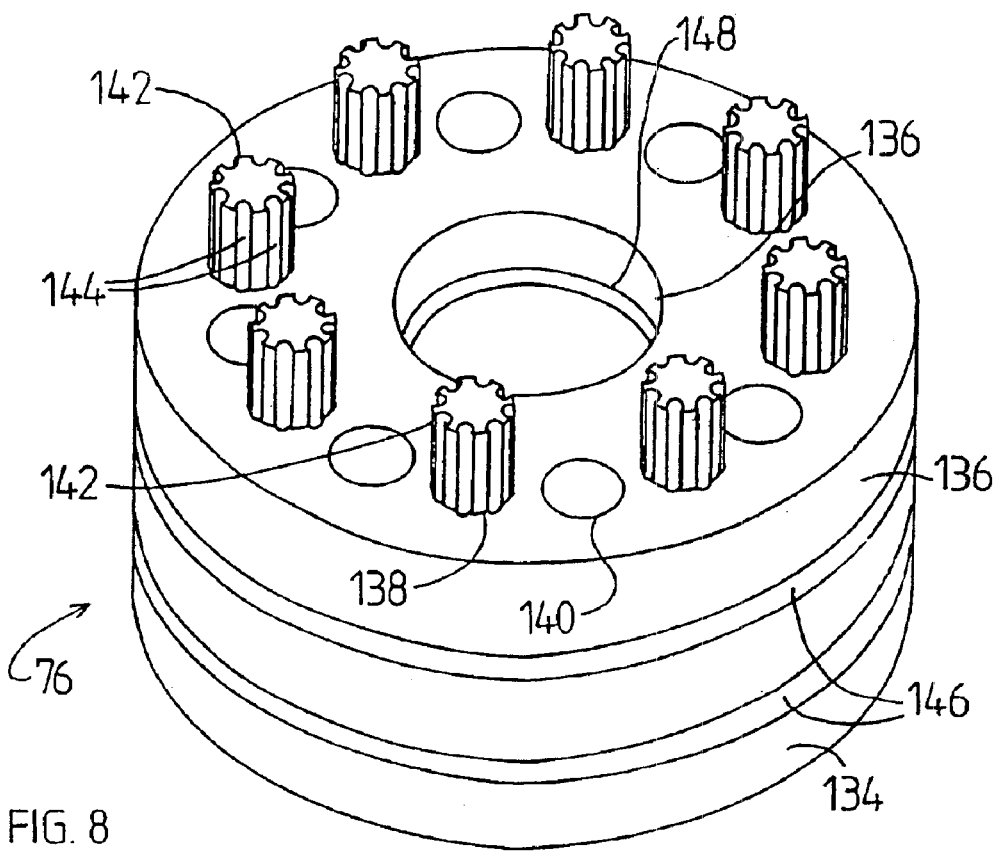
FIG. 8 is a pictorial view of a structure in which synthetic plastics material pellets are melted.
Figure 9:
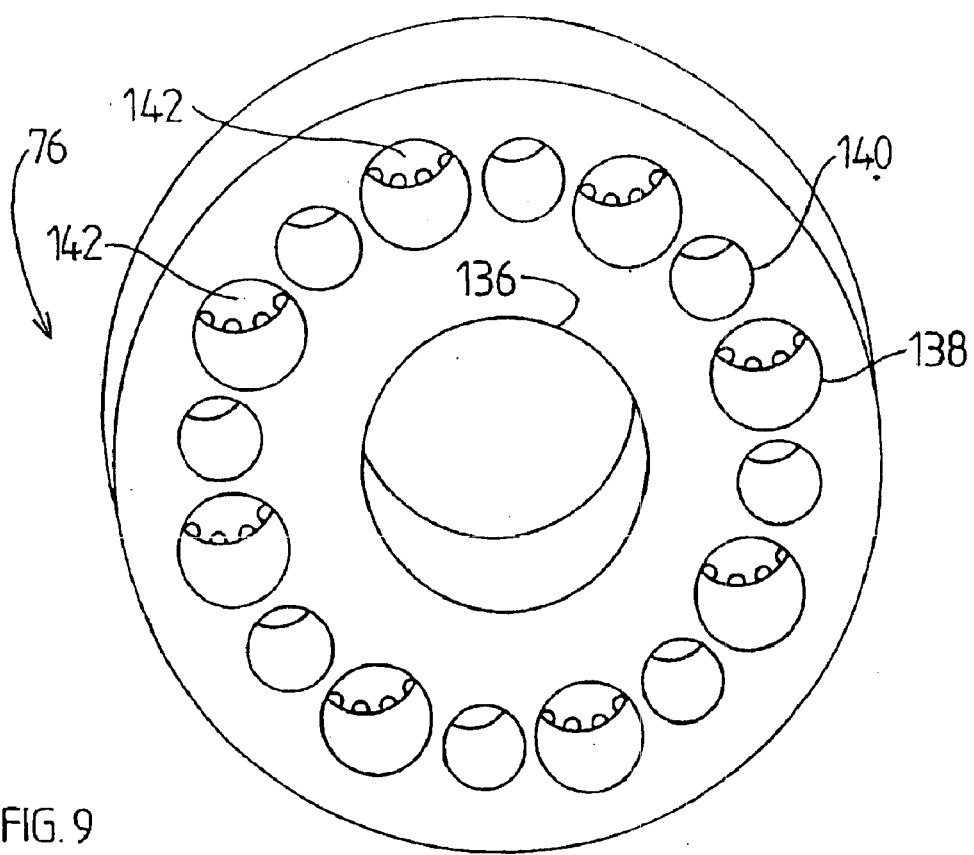
FIG. 9 is a pictorial view of the structure of FIG. 8 seen from the opposite side.

Each larger diameter bore 138 is partly plugged at one end by a short bar 142 of copper or other material having external flutes 144. The bars 142 are force fitted into bores 138. As best seen in FIG. 8, the bars 142 protrude from one face of the block 134. The flutes 144 define passages and permit moulding material to be forced from the rear parts of the bores 138 into the structure 74 as will be described in more detail hereinafter. The projecting bars 142 fit in alternate bosses 108 of the plate 92. Heating elements 146 encircling the outer surface of the block 134 and heating elements 148 encircling the hole 136 are provided for raising the temperature of the block 134.

Figure 10:
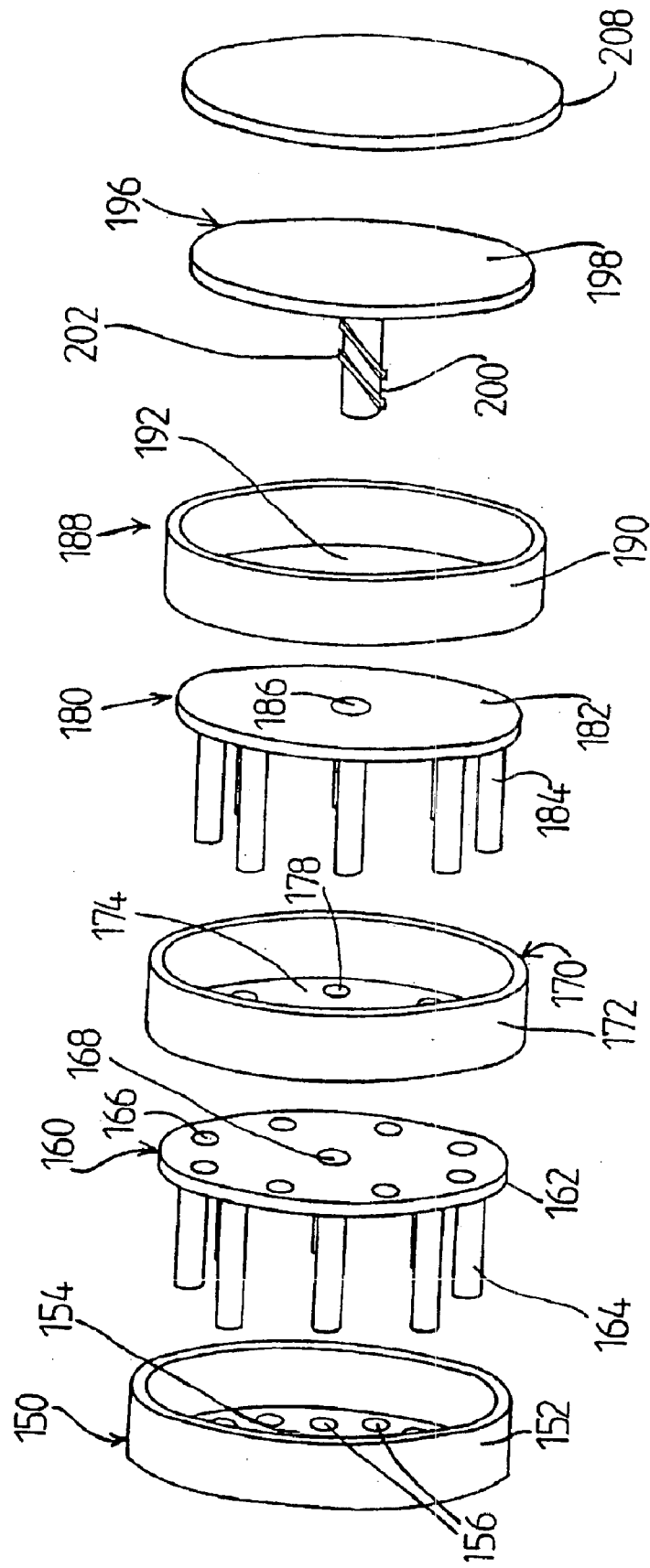
FIG. 10 is an exploded view of an hydraulically operated mechanism.

Turning now to FIGS. 10 and 11, the structure 82 and mechanism 84 include a first cylinder 150 which has a cylindrical side wall 152 and an end wall 154. Sixteen through bores 156 are provided in a circular array in the end wall 154. The end wall 154 also has a central hole 158.

A piston 160 comprising a piston disc 162 and eight equally spaced plungers 164 protruding from one face thereof fits into the cylinder 150. The plungers 164 pass through alternate bores 156 in the end wall 154. Alternating with the plungers 164 are through bores 166 provided in the disc 162. The disc 162 also has a central hole 168. Sealing means (not shown) encircle the disc 162 to seal between it and the cylinder side wall 152.

A second cylinder 170 also comprises a cylindrical side wall (designated 172) and an end wall (designated 174). There is a central hole 176 in the end wall 174 and in addition there is an array of eight equally spaced through bores 178 in the end wall 174.

A second piston 180 comprising a piston disc 182 with eight equally spaced plungers 184 fits in the cylinder 170. The disc 182 also has a central hole 186. The sealing means between the disc 182 and the side wall 172 of the cylinder 170 have not been shown. The plungers 184 pass through the bores 178 of the end wall 174, through the bores 166 of the disc 162 and through alternate bores 156 of the end wall 154.

A third cylinder 188 is also provided, the cylinder 188 having a cylindrical side wall 190 and an end wall 192. The end wall 192 has a central hole 194 therein. A piston 196 including a disc 198 with a stub shaft 200 protruding from the centre of one face thereof fits into the cylinder 188. The shaft 200 has spiral splines 202. The sealing means between the disc 198 and the wall 190 have not been shown.

A shaft 204 (not shown in FIG. 10) passes through the central holes 194, 186, 176, 168, 158, 96 and 112 and enters the bore 122 of the disc 94. The end of the shaft 204 is of the same non-circular shape as the bore 122. The shaft 204 has an internally grooved socket 206 which receives the stub shaft 200. The shaft 204 can rotate but is restrained from moving axially.

A cover plate 208 (FIG. 10) closes off the cylinder 188.

There are further sealing means where the shaft 204 passes through the end walls 154, 174 and 192 of the cylinders 150, 170 and 188. There are also sealing means where the plungers 184 pass through the bores 166 and 178 and where the plungers 164 and 184 pass through the through bores 156 in the end wall 154.

Inlets for hydraulic fluid under pressure are provided in the cylindrical side walls 152, 172, 190. This enables hydraulic fluid under pressure to be supplied to opposite sides of the piston discs 162, 182, 198 so that the pistons can be reciprocated in their cylinders.

Between the rear face of the block 134 and the front face of the end wall 154 of the cylinder 150 there is a small gap. Bridging this gap are sixteen tubes 210 (FIG. 12) each of which has a side entrance 212 for synthetic plastics material pellets. The tube 210 is stepped externally to form a spigot 214. Each entrance 212 has one of the feed tubes 80 connected thereto and each feed tube has a spiral therein for feeding pellets along the tubes to the entrance from the hopper 78 to which the other ends of the tubes are connected. Feed systems of this type are commercially available and will not be described in more detail herein. One such system is known as the "Transitube" system.

The spigots 214 fit into the rear ends of the bores 138.

Figure 13:
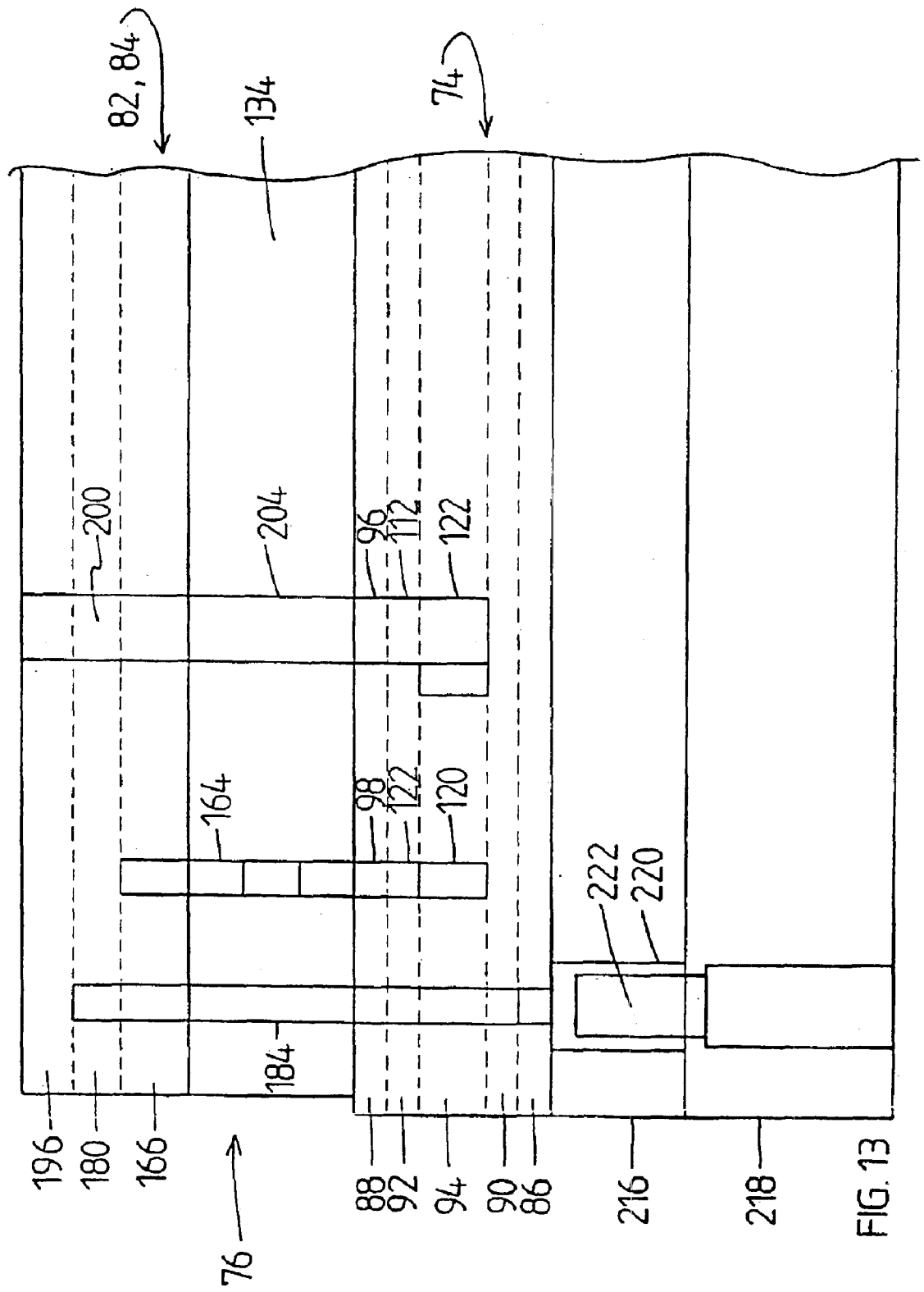
FIG. 13 is a diagrammatic representation of the apparatus.

Turning now to FIG. 13, this diagrammatically illustrates the structures 74 and 76 as well as the mechanism 82. It also illustrates a cavity plate 216 and a core plate 218. The Figure is diagrammatic in that certain bores are shown out of position and certain components are shown juxtaposed whereas in fact they are separated by spaces.

The cavity plate 216 has therein a ring of eight cavities 220 each of which has for illustrative purposes the external configuration of a bottle cap. The plate 216 is fixed with the entrances to the cavities 220 in register with the bosses 116 of the plate 90.

The plate 218 is reciprocable towards and away from the plate 216 and carries a ring of eight cores 222 which move into and out of the cavities 220. The cores 222 have the same shape as the inner configuration of a bottle cap. Each includes a pin for forcing a moulded bottle cap off the core and, depending on the internal configuration of the cap, may be collapsible.

In use the spirals in the feed tubes 80 are switched on so that pellets of synthetic plastics material are fed to the tubes 210 which bridge between the structures 74 and 76. Simultaneously the heating elements 146, 148 of the block 134 are switched on to raise the temperature of the block to a level sufficient to melt the pellets.

Hydraulic fluid is fed under pressure to the rear face of the piston 160 so that the piston 160 moves along the cylinder 150. The plungers 164 slide through the end plate 154 and into the pellet filled tubes 210 forcing the pellets into the parts of the bores 138 behind the bars 142. Several strokes of the piston 160 are required at start up to fill the bores 138 with plastics material as the bores 138 each have a capacity many times that of the bores 120. The material in the bores 138 softens as the block 134 heats up.

Once the bores 138 are full, the next forward stroke of the plungers 164 forces molten plastics material along the flutes 144, through alternate through bores 98 and into the through bores 120 of the disc 94.

At this stage the through bores 120 in the disc 94 are aligned with those through bores 106 in the intermediate plate 92 through which the plungers 164 slide but these bores of the disc 94 are not aligned with the through bores of the plate 90. Thus alternate through bores in the disc 94 are each filled with a charge of plastics material. This charge is equal in volume to the volume of the final product.

The plungers 164 are retracted by feeding hydraulic fluid to the other side of the piston 160. The plungers 164 withdraw sufficiently far to clear the entrances 212 to the tubes 210 so that the spirals can feed further pellets into the tubes 210. Thus in use each reciprocation of the plungers 164 feeds eight charges of material into eight of the through bores 120 in the disc 94.

Whilst both the plungers 164 and 184 are withdrawn, hydraulic fluid is fed to the one side of the piston disc 198. The shaft 200 thus moves in a forward stroke or a rearward stroke. The splines 202 on the shaft cause the shaft 200 to rotate through twenty two and a half degrees. This is sufficient to rotate the disc 94 to a position in which the empty through bores 120 in the disc 94 are aligned with the bores in the plate 92 through which the plungers 164 slide and are closed-off by the plate 90. Simultaneously the filled through bores 120 in the disc 94 are aligned with the bores 114 in the plate 90.

On the next forward stroke of the plungers 164 the empty through bores 120 of the disc 94 are filled with molten material.

The plungers 184 move further in the forward direction than do the plungers 164 as they have to pass through all the plates 86, 88, 90 and 92 and also through the disc 94. The plungers 184 are at this time aligned with those through bores 120 of the disc 94 which were previously filled with molten plastics material. This is because the disc 94 has been rotated to bring the filled bores 120 into alignment with the plungers 184.

The cores 222 are at this time in the cavities 220 and the plate 218 clamped by hydraulic pressure to the plate 216.

Hydraulic fluid under pressure is then supplied to the rear face of the piston 180 to force the piston 180 and plungers 184 in a forward stroke. The plungers 184 slide through the aligned through bores in the plates 86, 88, 90, 92 and disc 94 until the leading ends of the plungers 184 are flush with the interface between the plate 86 and the plate 92. The charge of molten material is thus forced into the cavity 220, put under moulding pressure and moulded to shape. The front faces of the plungers 184 form parts of the walls of the cavities.

The plungers 184 are then withdrawn by feeding hydraulic fluid to the other side of the piston 180. The plungers 184 only have to be withdrawn until their leading ends are just clear of the disc 94. As soon as this stage has been reached the shaft 204 is rotated through 22.5 degrees in the opposite direction by feeding hydraulic fluid to the other side of the piston disc 198. This brings eight further charges of molten synthetic plastics material into alignment with the plungers 184, and eight now empty through bores in the disc 94 into alignment with the plungers 164.

The cycle described is then repeated.

As the plungers 184 withdraw, the cores 222 withdraw into the plate 218, having previously collapsed if this is the type of core used. Simultaneously, the plates 216 and 218 separate to enable the moulded product to be ejected by means of the ejector pins. The plates 216 and 218 then move together and are clamped, the cores 222 move into the cavities 220 and the plungers 184 move in the forward direction once more to force eight further charges of plastics material into the cavities 220.

Instead of there being ejector pins carried by the cores 222, the arrangement can be such that the caps remain in the cavities 220 and are ejected by portions of the plungers 184 which move forward at the end of the moulding cycle.

If an air feed pipe is provided down the centre of each plungers 184 and into the respective cavity, the molten synthetic plastics material can be blown to a hollow shape.

It is also possible for each plungers 184 to be hollow over a short part of the length thereof just behind the front face that forms part of the wall of the cavity. The hollow interior of the shaft is connected to the cavity by a multitude of small holes. Pins within the hollow interior of the shaft normally block off these holes. The hollow interior of each shaft is connected to a source of colouring material under pressure. Means are provided for withdrawing the pins from the holes for a brief period at the end of each moulding cycle so that the colouring material can squirt through the holes onto the top surface of the formed cap.

By appropriately arranging the small holes, a design and/or words can be "painted" onto the exterior of the face of the cap in the manner of a dot matrix.

If the material being moulded is a powdered metal eg aluminium that is thereafter to be sintered or a ceramic which is thereafter to be fired, the heating means of the block 134 can be omitted.

The disc 94, instead of oscillating back and forth through 22.5 degrees, can rotate stepwise in the same direction.

Figure 14:
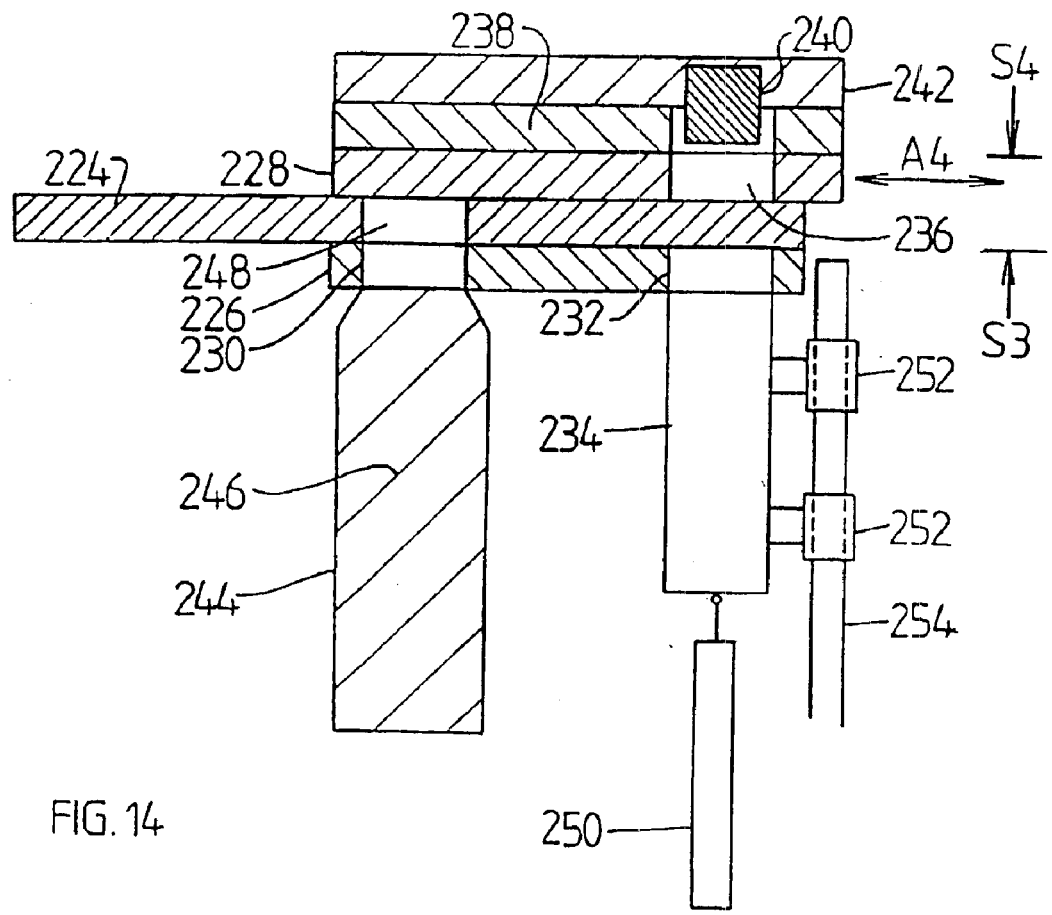
FIG. 14 is a diagrammatic representation of a further form of apparatus.
Figure 15:
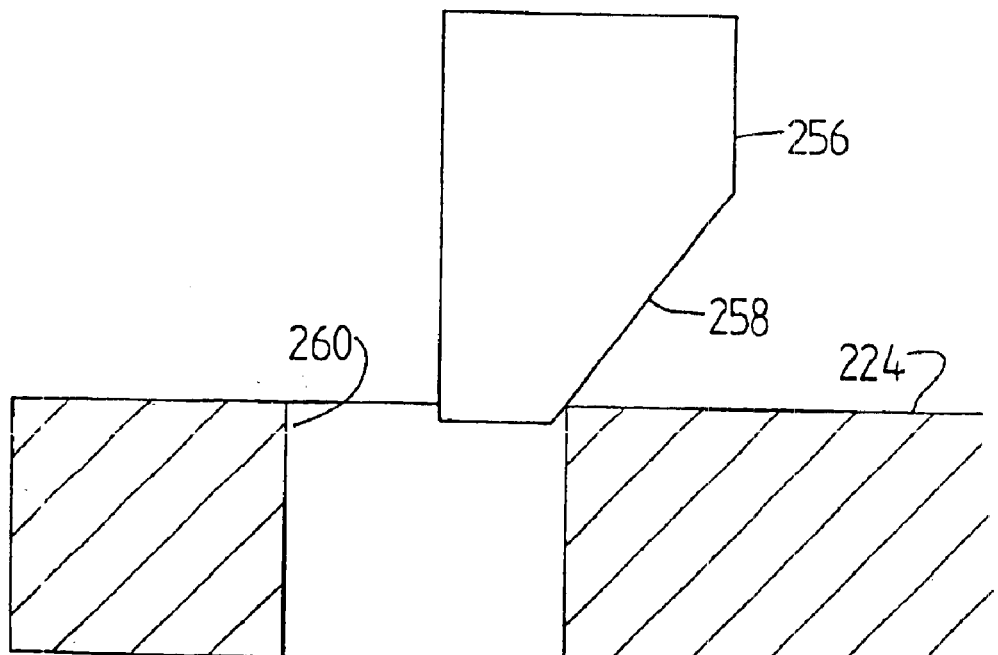
FIG. 15 illustrates, to a larger scale, a detail of the apparatus of FIG. 14.

In a further form of apparatus according to the present invention, as shown in FIGS. 14 and 15, the transfer element 224 is reciprocable as shown by double-headed arrow A4, in a gap bounded between front and rear plates 226 and 228. The front plate 226 has therein an opening 230 forming part of the passage 30 immediately adjacent the element 224 and also has therein an opening 232 for receiving a plunger 234. The rear plate 228 has an opening 236 leading to the female cavity in a mould plate 238. The male mould 240 is mounted on a further mould plate 242. The hydraulic means for clamping the plates 238 and 240 together have not been shown. All the plates 224, 226 and 228 can be of "Teflon" or any other low friction, low surface tension material.

An extruder barrel and screw 244 and 246 form means for feeding molten mouldable material to the holding cavity which is designated 248 and is in the element 224.

The plunger 234 is moved in forward and return strokes by an hydraulic cylinder 250 and is guided for rectilinear movement by a pair of bushes 252 which slide on a guide rod 254.

Stops (not shown) limit movement of the plunger 234 between a forward position at S4 in which its front end is flush with the face of the plate 238 and thus forms part of the wall of the mould cavity and a retracted position in which its front end is at S3 and hence clear of the element 224.

To enable a moulded cap to be ejected from the mould cavity, the plate 242 moves away from the plate 238 and the plate 238 moves away from the plate 228. A pin (not shown) forming part of the male mould forces the cap off the male mould so that it drops down between the plates 228 and 238.

If reference is made to FIG. 15, there is shown a pin 256 which has a camming surface 258. The pin is secured to the plate 242 and enters a bore 260 in the element 224. A spring or fluid cylinder (not shown) displaces the element 224 to the position shown in FIG. 14. As the mould closes, the pin 256 enters the bore 260 and its camming surface 258 moves the element 224 to the right as viewed in FIG. 14. The pin 256 thus forms not only the means for displacing the element 224 but also the means for locating the element 224 in exact register with the opening 236 and plunger 234. Two or more pins and bores are provided.

Cooling means, eg water jackets and a supply of chilled water, can be provided in association with the mould cavity for the purpose of shortening the cycle time.

Whilst all of the illustrated forms of apparatus have been described as having a single holding cavity, it is desirable to provide a multitude of holding cavities and a multitude of plungers. The plungers can displace plastics material to one moulding cavity or a plurality of moulding cavities.

In the first form one component having a volume equal to the total of the volumes of the holding cavities can be made. In a second form a plurality of identical or different components can be formed. For example, all the components for one article can be produced in a single cycle. Because each holding cavity is individually supplied with mouldable material, the components can be of different plastics and/or can be of different colours.

As none of the forms of apparatus described include narrow gates, sprues and runners that block easily, it is believed that a much wider range of materials will be mouldable in the apparatus described that can be moulded with currently available injection moulding machines. For example, as there are no pin gates that can be blocked, it is believed that synthetic plastics materials with fibres dispersed therein can be moulded. Provided the materials used in the construction of the apparatus are able to withstand the temperatures which must be attained, it is believed that the moulding of glass articles will be possible.

Referring now to FIGS. 16 to 20, the apparatus 310 illustrated comprises a melt barrel 312 having therein an extruder screw 314. The barrel 312 comprises a cylinder 316 which constitutes the greater part of the length of the barrel 310. A hopper 318 opens into the cylinder 316 close to the end wall 320 thereof. A drive shaft 322 passes through the wall 320 and a motor (not shown) rotates the shaft 322. The screw 314 comprises the shaft 322 and a flight 324.

The barrel 312 further includes a tapering section 326 and a nozzle 328. Heating bands 330, 332 and 334 (only shown in FIG. 16) encircle the cylinder 316, tapering section 326 and nozzle 328. The nozzle 328 leads to a flexible hose 336 which is itself heated.

A mould is shown at 338, the mould comprising a fixed mould part 40 and a movable mould part 342. The cavity 344 of the mould, which has the shape of the article to be produced, is shown by chain dotted lines. The line along which the mould opens is designated SL. The means for displacing the movable mould part in mould opening and mould closing movements, as shown by the double headed arrow A, have not been illustrated.

A sleeve 346 is positioned between the nozzle 328 and the mould 338. The flexible hose 336 is connected to a port 348 in the cylindrical wall of the sleeve 346. Immediately adjacent the port 348 there is a second port 350. The axis of the port 350 lies in the same horizontal plane as the axis of the port 348. A further port 352 is provided in the walling of the sleeve 346 diametrically opposite the port 350. The fixed mould part 340 has a port 354 therein which aligns with the port 352 and leads into the cavity 344.

A drive structure, not illustrated, is provided for reciprocating the sleeve 346 in the direction of the double headed arrow B. Stops (not shown) are provided for limiting movement of the sleeve 346 and positioning it accurately in the axial direction.

Within the sleeve 340 there is a solid cylinder 356 which is fixed to a frame (not shown) of the apparatus. The mould part 340 is fixed to the same frame. A transverse bore 358 passes diametrically through the cylinder 356.

Figure 16:
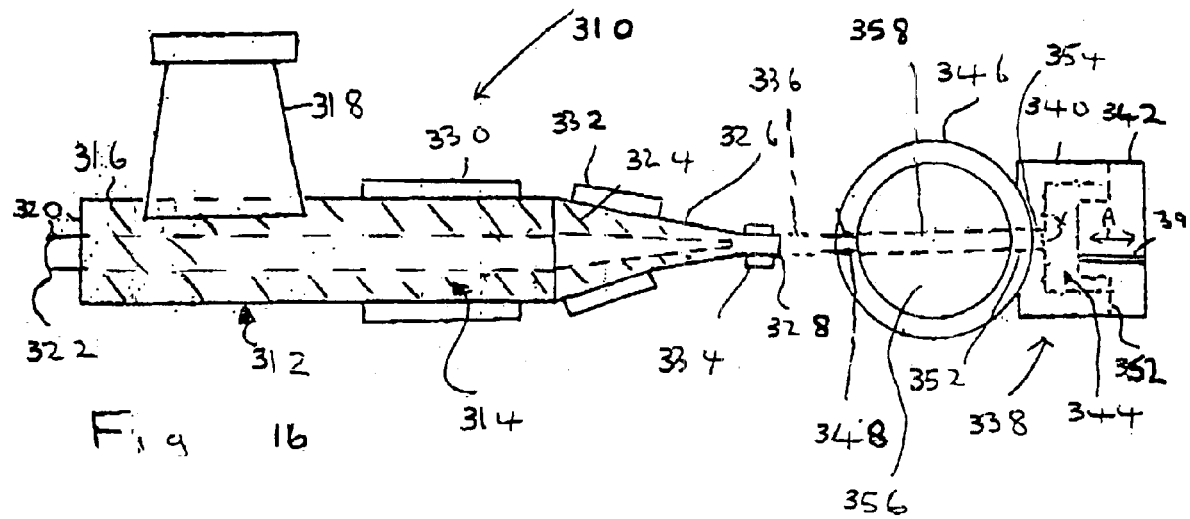
FIG. 16 is a diagrammatic side elevation of another form of moulding apparatus in accordance with the present invention.

A plunger 360 is provided which is reciprocal in the direction indicated by the double headed arrow C. When the port 350, bore 358, port 352 and port 354 are aligned (see FIG. 17), the plunger 360 can be advanced to a position in which its front face lies at the position marked X (FIG. 16). This face thus forms part of the bounding surface of the mould cavity.

Figure 17:
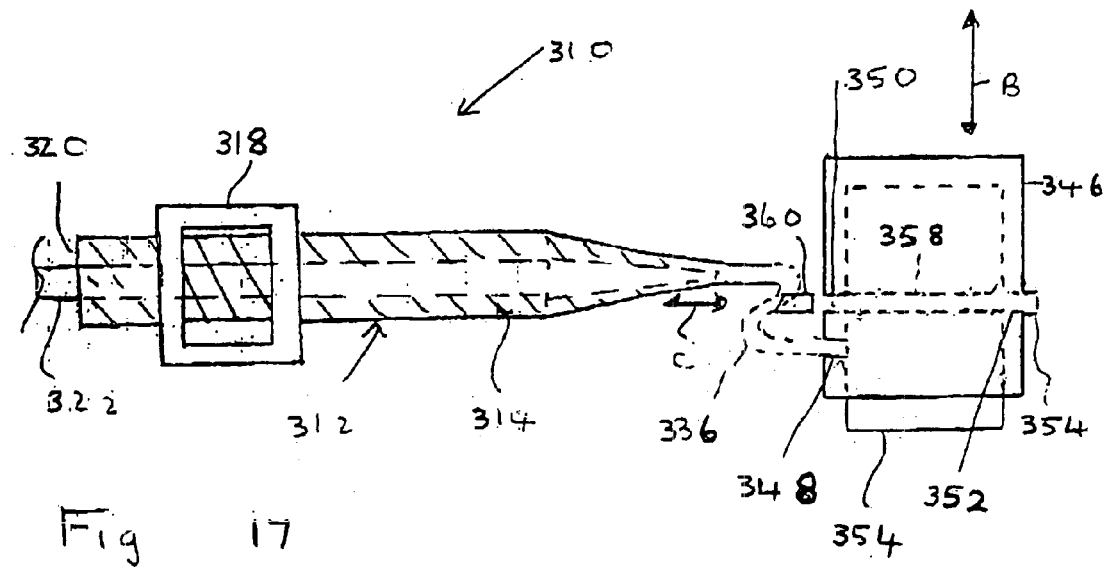
FIG. 17 is a top plan view of the apparatus of FIG. 16.

The operation of the apparatus of FIGS. 16 and 17 is as follows. The screw 314 provides a supply of molten synthetic plastics material under pressure to the hose 336 and hence to the port 348. At the beginning of the cycle the sleeve 346 is in one of its two end positions. In this position the bore 358 is in alignment with the port 348 but closed at its other end by a unapertured part of the sleeve 346. The screw 314 forces molten synthetic plastics material into the bore 358 through the port 348.

Figure 20:
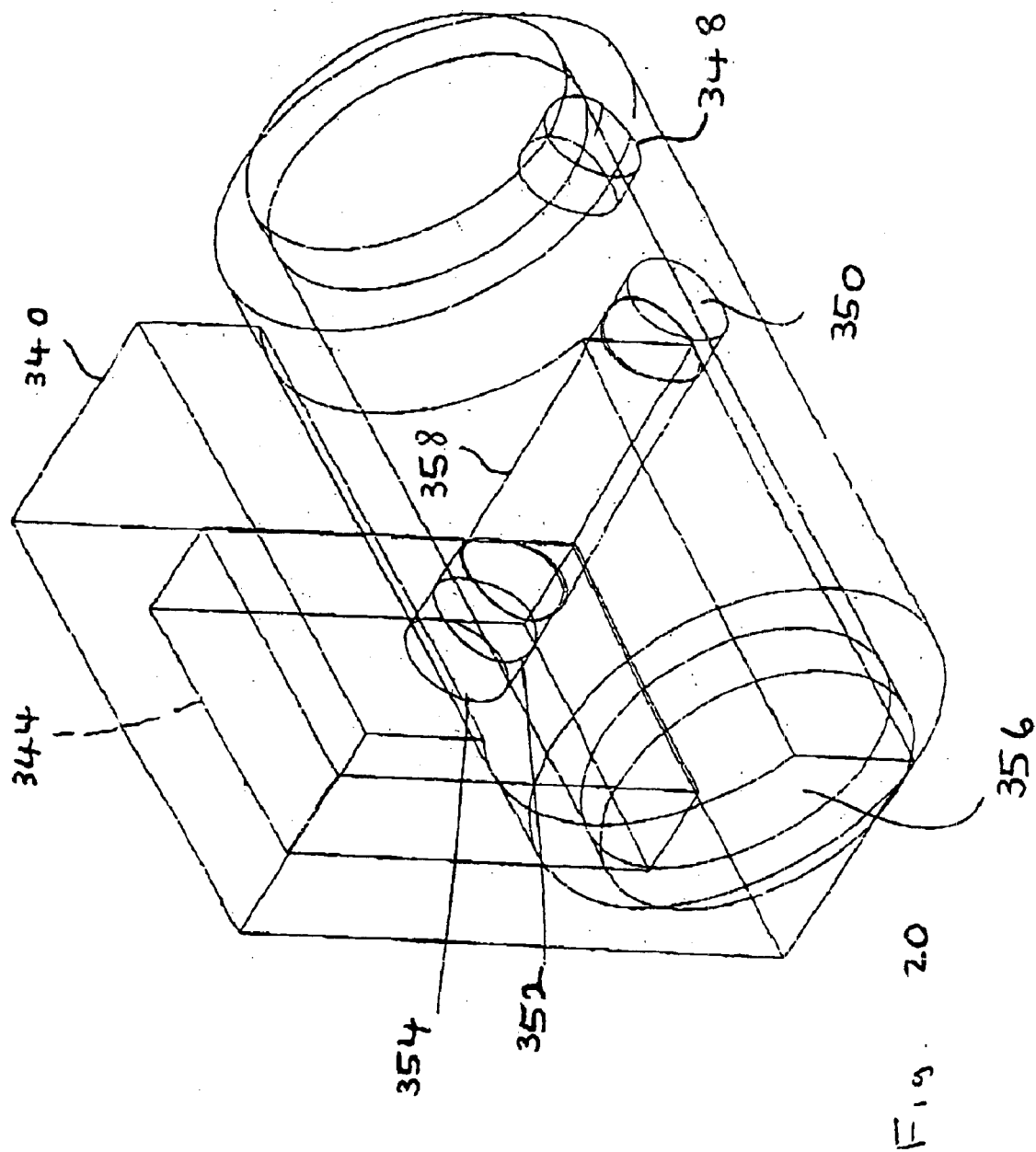
FIG. 20 is a pictorial view of the components of the apparatus of FIGS. 18 and 19 in assembled condition.

The sleeve 340 is then displaced to its other end position so that the port 350, bore 358, port 352 and port 354 align (see FIG. 20). The plunger 360 is then advanced until the front face thereof is at X.

It will be understood that when the sleeve 346 moves as described it acts as a valve, cutting-off the bore 358 from the port 348. The port 348 remains connected to the hose 336 at one end but is shut-off at the other end by the valve constituted by the cylinder 356. The bore 358 is filled with plastics material and its volume equals that of the cavity 344. Thus the cavity is completely filled with plastics material when the plunger 360 displaces it from the holding cavity constituted by the bore 358 into the moulding cavity 344.

To ensure that the plunger 360 is properly aligned, it is possible for its front portion to remain permanently in the port 350 and never to be withdrawn therefrom. This means that the plunger 360 and the drive mechanism therefor must move with the sleeve 346. In an alternative construction the plunger is withdrawn from the port 350 before the sleeve 346 moves. In this form the port 350 can be flared so that the plunger 360 enters the wider end of the port 350 without any possibility of fouling.

Keyways and splines, or other suitable guide means such as rods passing through bores within the walling of the sleeve 346, ensure that the sleeve 346 moves in a straight line and cannot rotate about its axis.

Figure 21:
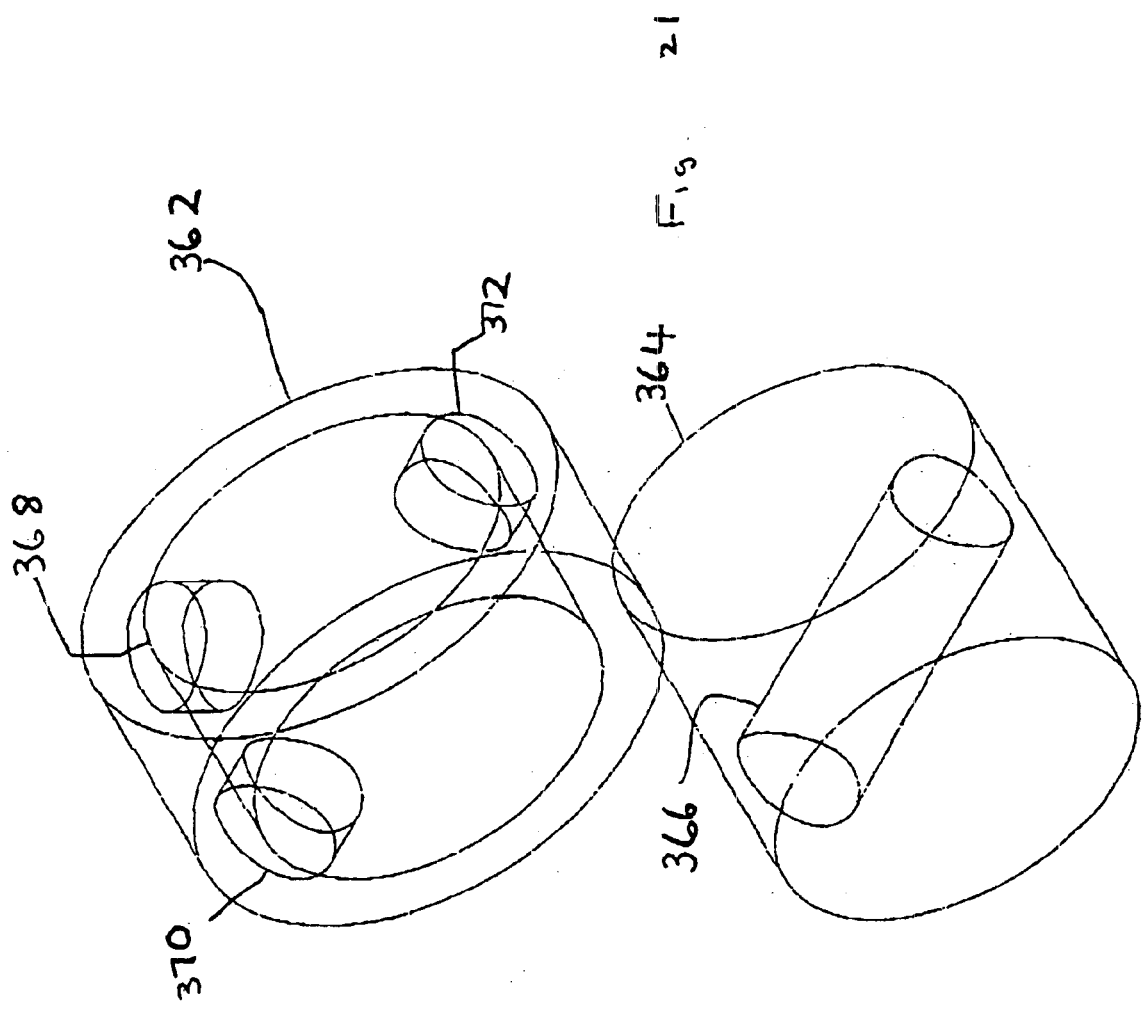
FIG. 21 is a pictorial view of a further form of moulding apparatus.

In FIG. 21 a further sleeve 362 is shown together with a solid cylinder 364 which fits within the sleeve 362. The cylinder 364 is of the same configuration as the cylinder 356 and has a diametrically extending bore 366 which is open at both ends. The sleeve 362 has ports designated 368, 370 and 372. The ports 370 and 372 are diametrically opposed. The axis of the port 368 lies in the same diametrical plane as the aligned axes of the ports 370 and 372. It is, however, displaced around the sleeve 362 with respect to the ports 370 and 372. Whilst the axis of the port 368 can be at right angles to the coaxial axes of the ports 370 and 372, it is desirably as close to the port 370 as possible. This reduces the angle through which the sleeve 362 must be turned during operation.

Figure 19:
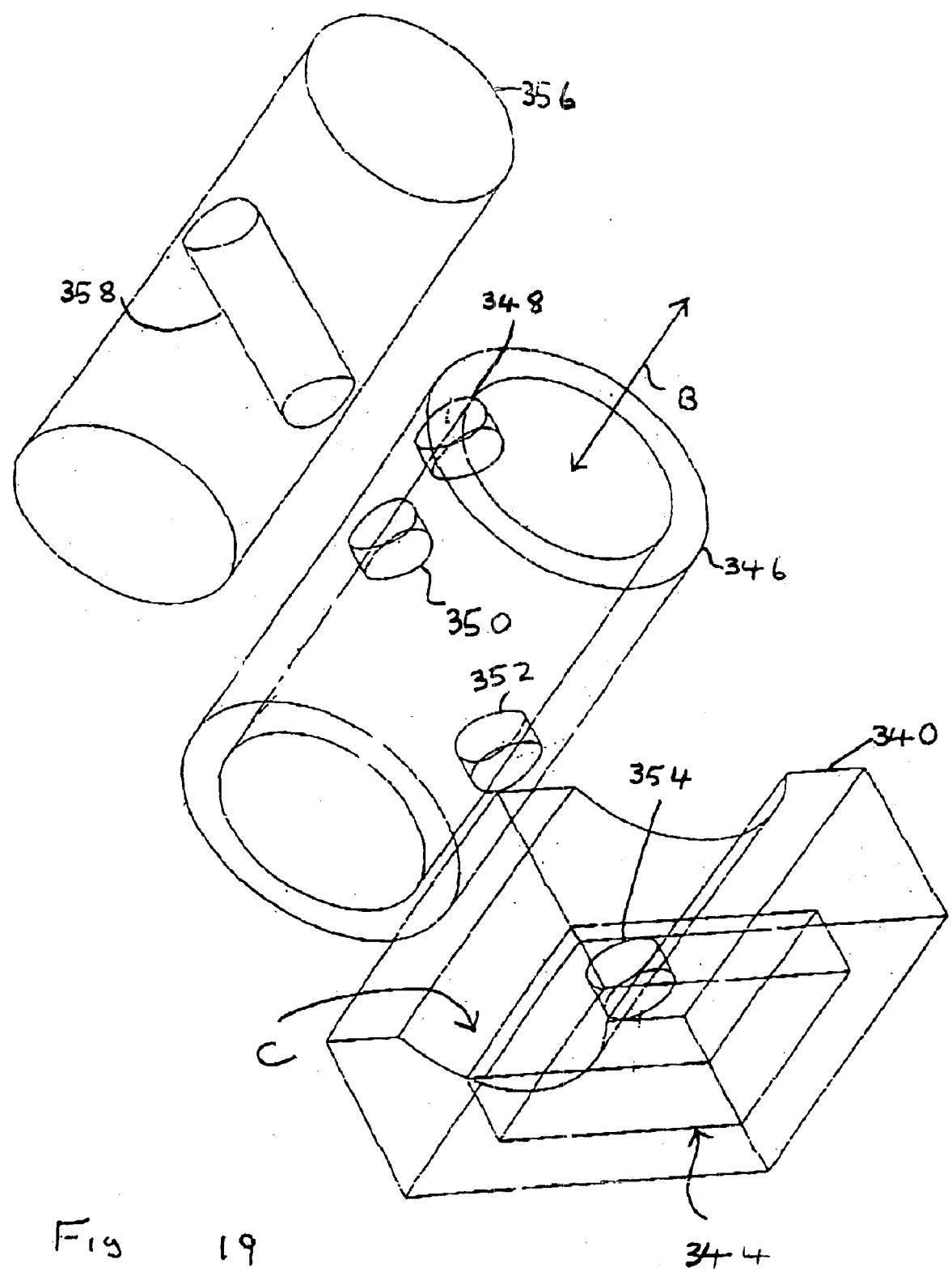
FIG. 19 is an exploded pictorial view of the components of FIG. 18.

The sleeve 362 fits into the part cylindrical cavity C best seen in, for example, FIG. 19. In operation, the port 368 is connected to the flexible hose 336 and hence is continuously supplied with molten synthetic plastics material under pressure. When the sleeve 362 is turned to align the port 368 with the bore 366, the other end of the bore 366 is closed-off by an unapertured part of the sleeve 362. Thus the bore 366, which constitutes a holding cavity, can be filled with synthetic plastics material. Once the holding cavity is full, the sleeve is rotated through an angle such as to bring the ports 370 and 372 into alignment with the bore 366 and the port 354 which leads into the cavity 344. The plunger (not shown in FIG. 21) is then displaced in its forward stroke so that it enters the bore 366, passes through the bore 366, the port 372 and the port 354 and stops when its face is at X. The plunger has thus displaced the charge of plastics material that was in the bore into the mould cavity. Once the plunger has withdrawn, the sleeve rotates sufficiently far to bring the port 368 into alignment with the bore 366, and the bore is then refilled.

Figure 22:
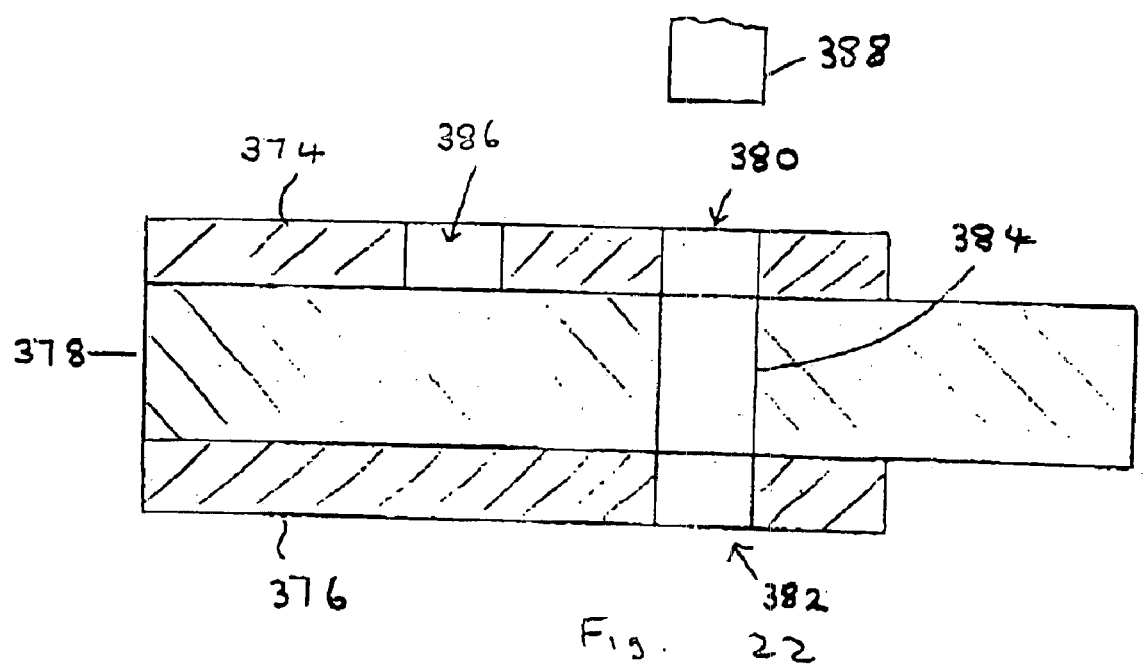
FIG. 22 illustrates a still further form of the invention.

The moulding apparatus of FIG. 22 comprises a pair of linearly displaceable, parallel outer plates 374 and 376 and a central plate 378 which is between the outer plates 374, 376 and is fixed with respect to the mould part 340. The plate 376 reciprocates in a guide way (not shown) of the mould part 344.

The plates 374 and 376 have two aligned ports 380 and 382. The fixed plate 378 has a bore 384 through it, the bore 384 forming a holding cavity. The plate 374 has a second port 386 to which the hose 336 is permanently connected. When the plates 374 and 376 are positioned with respect to the mould as shown in FIG. 22, the ports 380 and 382, bore 384 and port 354 are all aligned and the plunger shown at 388 can advance through the ports and bore until its front face is at X. Thus the plastics material previously in the bore 384 is displaced through the port 354 and into the mould cavity 344. The plates 374 and 376 are then slid to the right so that the port 386 comes into alignment with the bore 384. The other end of the bore 384 is closed by the plate 376 which also closes the port 354 which leads into the mould.

The bore 384 is thus filled with synthetic plastics material. Once the bore 384 is filled the plates 374 and 376 move in the opposite direction bringing the bore 384 back into alignment with the ports 380 and 382. The plunger 388 then moves forward so that its front faces move to the position shown at X thereby commencing the next cycle.

The hose 336 remains permanently connected to the port 386. The plunger 388 can remain in the port 380 at all times, and hence slide back and forth with the plates 374 and 376, or the port 380 can be flared to allow the plunger 386 to enter it without fear of fouling the edge of the port.

To enable materials of different types to be displaced into the same mould it is possible to arrange two or more sleeves 346 and cylinders 356 between the melt barrel 312 and the mould 338. Each bore 358 is filled with a specific material. The sleeves 346 are then displaced to the position in which their ports 350, 352 are aligned with the filled bores 358 and a single plunger used to push the charges of material into the mould one behind the other. Hence the plunger enters the bore 358 of the cylinder 356 closest to the melt barrel 312, pushes the material from that bore into the next bore and then displaces the material from both bores into the mould cavity 344.

Figure 23:
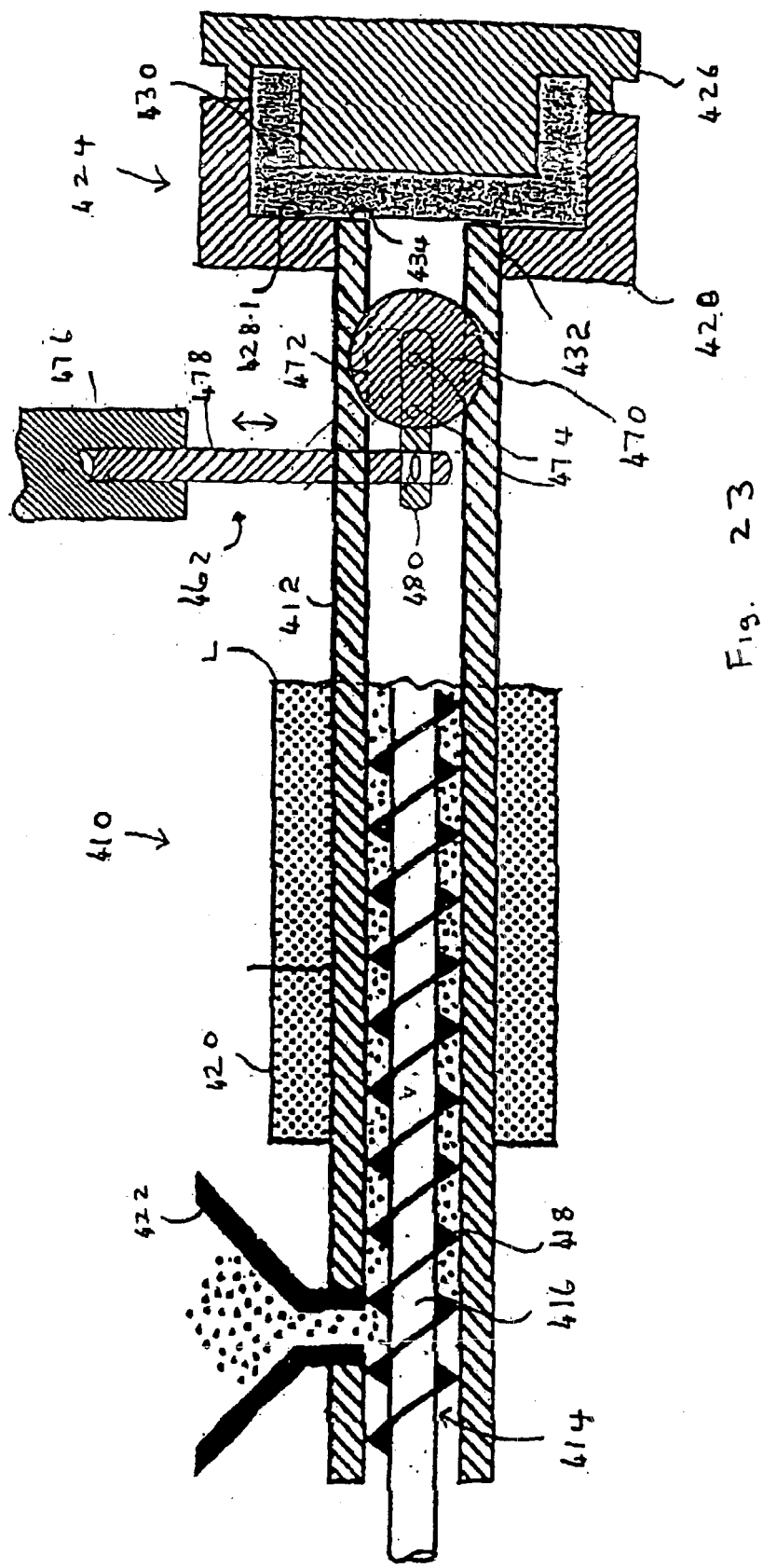
FIG. 23 is a diagrammatic longitudinal section though moulding apparatus.

Referring now to FIG. 23, the moulding apparatus 410 illustrated comprises an elongate melt barrel 412 which has therein a feed screw 414 comprising a sleeve 416 which carries a flight 418. A heating collar 420 encircles the barrel 412. The screw 414 and collar 420 have been broken off at line L so that other parts of the apparatus can be illustrated. They would, in practice, extend further to the right.

A hopper 422 leads into the rear end of the melt barrel 412 and pellets of synthetic plastics material feed into the flight 418 from the hopper 422.

A mould 424 comprising a male part 426 and a female part 428 bound the cavity 430 which has the shape of the article to be moulded. The female mould part 428 has a bore 432 therein and the melt barrel's leading end is inserted into the bore 432 and is a tight fit therein. The front end face 434 of the barrel 412 is flush with the surface 428.1 of the mould part 428 which bounds one side of the cavity 430.

Figure 24:
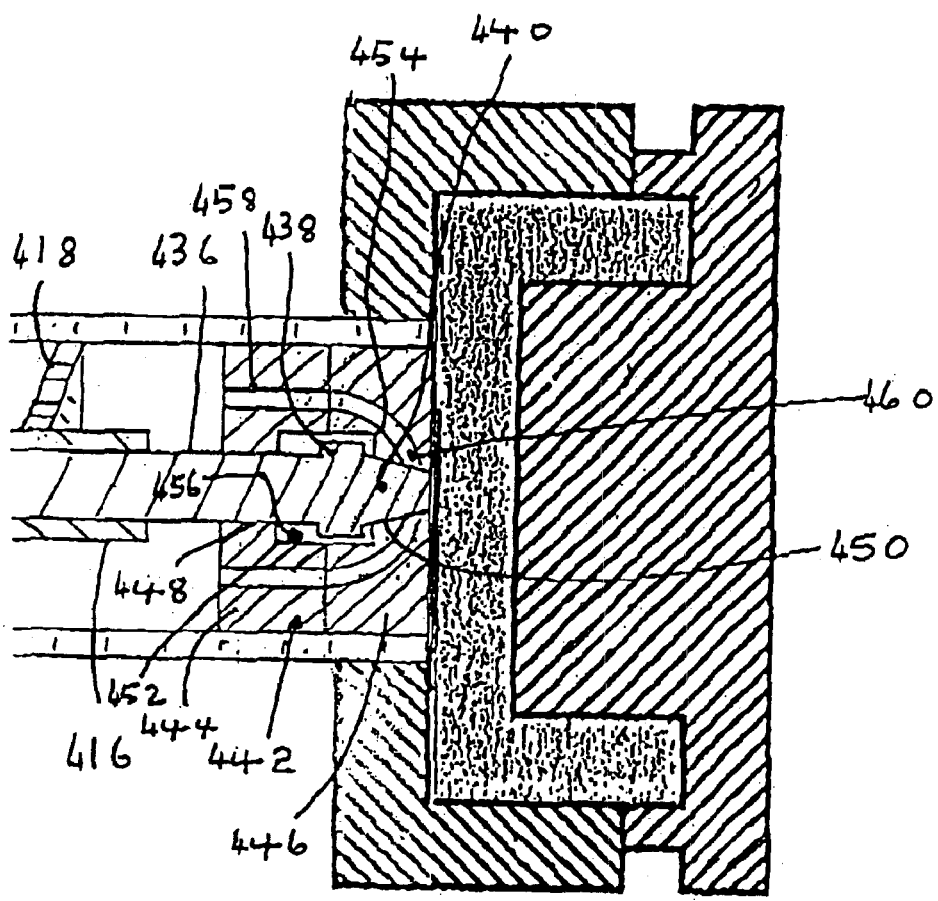
FIG. 24 illustrates a part of the apparatus of FIG. 23 to an enlarged scale.

A shaft 436 (see FIGS. 24, 27 and 28) slides within the sleeve 416. The end portions of the shaft 436 protrude beyond the sleeve 416 in both directions. A pneumatic or hydraulic cylinder, an hydraulic or electric motor of any other suitable drive means is provided for displacing the shaft 436 in forward and return strokes. At the rear end of the shaft 436, the left hand end in FIGS. 27 and 28, there are means (not shown) which control the length of the stroke of the shaft 436. These means can be optical, mechanical or electromechanical and they control supply of power to the cylinder or motor which displaces the shaft 436 to and fro in the sleeve 416. In a simple form the shaft 436 carries a protruding striker and there are micro-switches adjacent the shaft.

The shaft 436 has an enlarged head 438 at the forward end thereof, and a frusto conical portion 440 beyond the head 438. On the forward end of the shaft 416 there is a piston 442 which comprises two parts 444 and 446 which are bolted or otherwise secured together. The parts 444 and 446 have axial bores 448 and 450 therein for receiving the shaft 436. Encircling the bores 448 and 450, and in those faces of the parts 444 and 446 which abut one another, are recesses 452 and 454. The head 438 of the shaft 436 is within the cavity 456 constituted by the registering recesses. The bore 448 is cylindrical to match the circular cross-section of the shaft 436 and the bore 450 is of tapering form to match the portion 440. The cavity 456 is bigger than the head 438 both axially and radially.

The part 444 has flow passages 458 therein, the passages being arranged in a circular array around the bore 448. The passages 458 extend axially. Further flow passages 460 are provided in the part 446. The passages 460 are also arranged in a circular array, the inlets to the passages 460 registering with the exits from the passages 458. Each passage 460 curves inwardly from its inlet end and its exit is where it enters the bore 450.

A shut-off structure generally designated 462 is located in the barrel 412 adjacent the leading end of the barrel 412. The structure 462 comprises a hollow block 464 (FIGS. 25 and 26) which is located between two sections of the barrel 412. The sections are designated 412.1 and 412.2 in FIGS. 25 and 26. The block 464 has a first bore 466 therethrough which is of the same diameter as the inside diameter of the barrel and is co-axial with the barrel. The block 464 has a second bore 468 which extends transversely and receives a rotatable shut-off member 470. The member 470 is cylindrical and fits snugly in the bore 468. The member 470 itself has a transverse bore 472 which is of the same diameter as the bore 466 and the inside diameter of the barrel 412. Two pins 474 protrude from one end face of the member 470. The pins 474 are connected to an actuator 476 (FIG. 23) by way of two rods 478 and 480. The actuator 476 which can be, for example, a solenoid, which oscillates the rod 478 vertically. The rod 480 is connected to the pins 474 and is oscillated about an axis co-incident with the axis of the member 470.

In use of the apparatus, plastic pellets entering the barrel 412 from the hopper 422 are mixed in the barrel by the shearing action of the flight 418. The pellets melt as a result of the heating and shearing to which they are subjected.

Whilst the shaft 436 is in the retracted position shown in FIG. 28, the rotating screw 414 feeds molten plastic material against the rear face of the piston 442. The piston 442 is forced as far to the right with respect to the shaft 436 as the play between the head 438 and the recess will allow. Plastics material thus flows through the passages 458 and 460 and part of the bore 450 into the chamber C (FIG. 27) between the piston 442 and the structure 462. At this time the member 470 is so positioned that the bore 472 lies at right angles to the bore 466. The member 470 thus shuts off the left hand part of the barrel 412 from the right hand part and the mould cavity. The position to which the shaft 446 has retracted determines the volume of the chamber C.

A sensor (not shown) can be provided in conjunction with the screw 414 or in conjunction with the motor which drives it. Upon the chamber C filling, resistance to rotation of the screw 414 increases. This increased resistance can be used to terminate rotation of the screw.

The member 470 is then rotated through a right angle to align the bore 472 with the bore 466. The shaft 436 is then advanced to the right. The first part of the movement of the shaft 436 is relative to the piston 442. The portion 440 move fully into the bore 450 and closes off the passages 460 thereby to prevent reverse flow of molten material.

The piston 442 moves along the barrel 412, enters the block 464, passes through the bore 472 and then through the remainder of the block 464. As the piston moves forward the plastics material which occupied the chamber C is pushed into the mould cavity 430. The front face of the part 446, when the shaft is in its fully advanced position, lies flush with the face 434 of the melt barrel and forms part of the bounding wall of the cavity 430.

Once the plastics material in the mould cavity has hardened, the mould part 426 is retracted to enable ejector pins (not shown) to displace the moulded article out of the female mould part 428. The shaft 436 then moves back to the left. The play between the head 438 and the part 444 is first taken up and then the piston 442 moves to the left with the shaft to begin another cycle.

The volume of the chamber C is determined by the position of the sensor which terminates the retraction of the shaft 436. If the sensor is moved to the right in FIGS. 27 and 28, retraction of the shaft stops early. The chamber C is thus of small volume. If the shaft retracts to the fullest extent possible, the chamber C is of its greater volume. By making some trial mouldings with too little plastics, and then moving the sensor to the left, it is possible to so adjust the apparatus that the volume of the chamber C equals the volume of the cavity 430.

Whilst in the illustrated form of the apparatus there is a single chamber C, it is desirable to provide a multitude of barrels, chambers and shafts. The shafts can displace mouldable material to one mould cavity or a plurality of mould cavities.

In the first form one component having a volume equal to the total of the volumes of the chambers C can be made, In a second form a plurality of identical or different components can be formed. For example, all the components for one article can be produced in a single cycle. Because each chamber C is individually supplied with mouldable material, the components can be of different mouldable material and/or can be of different colours.

As the apparatus described in FIG. 16 onwards does not include narrow gates, sprues and runners that block easily. It is believed that a much wider range of materials will also be mouldable in these forms of apparatus than can be moulded with currently available injection moulding machines. As explained, as there are no pin gates that can be blocked and it is believed that synthetic plastics materials with fibres dispersed therein can be moulded. Provided the materials used in the construction of the apparatus are able to withstand the temperatures which must be attained, it is believed that the moulding of glass and ceramic articles will also be possible.

Figure 25:
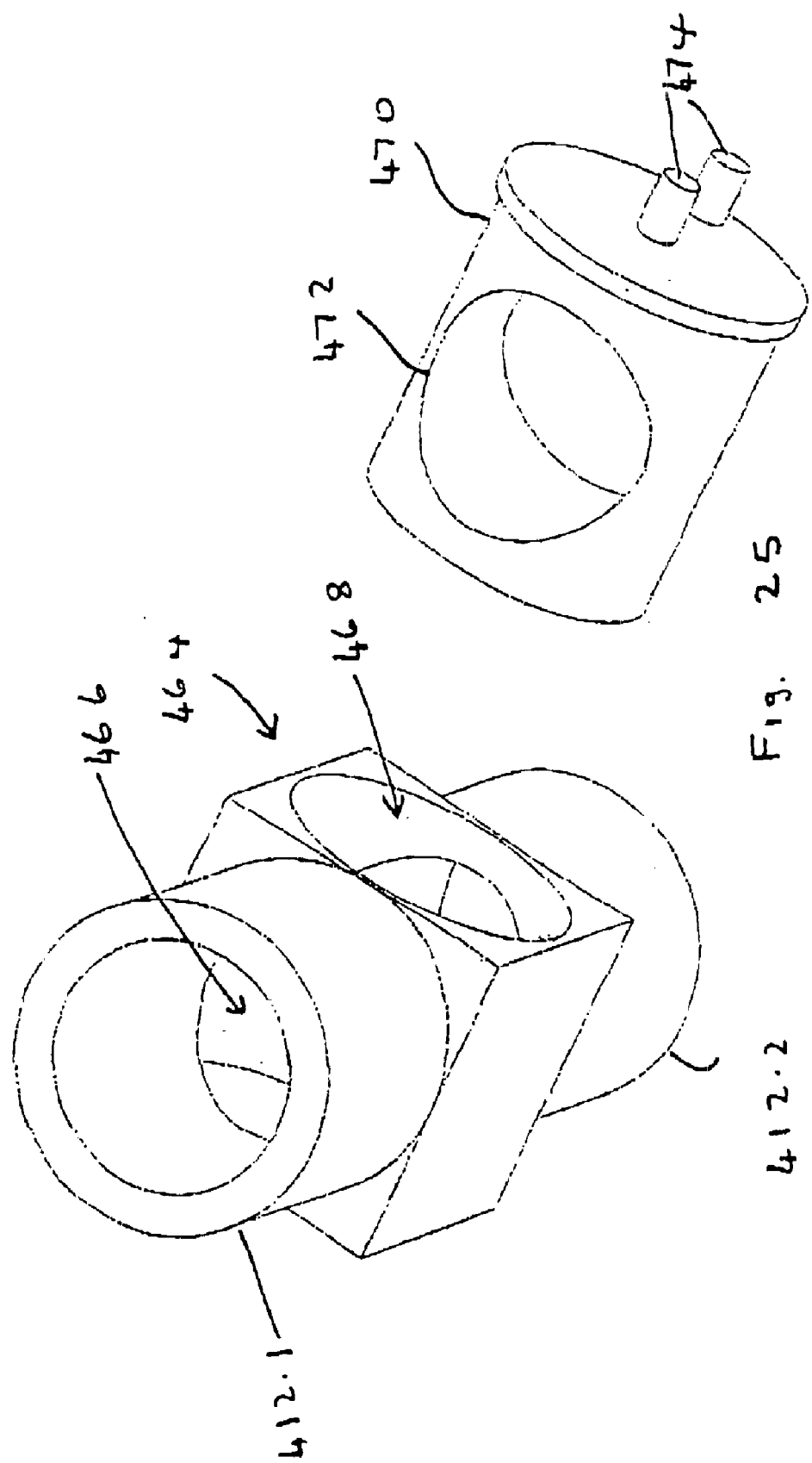
FIG. 25 is an "exploded" pictorial view of two other parts of the apparatus.

In a modified form the piston is a unit similar to that shown in FIGS. 25 and 26 and includes a longitudinal bore and a transverse bore. A closure member, equivalent to the closure member 470, is provided in the transverse bore. The transverse closure member can include gear teeth which mesh with stationary gear teeth in the barrel. Engagement between the two sets of teeth rotates the closure member between its open and closed positions. Thus no flow past the piston is permitted whilst it is moving forward, but flow is permitted to enable the chamber C to be filled.

It is possible to suck air from the mould cavity after the mould has closed, thereby to lower the pressure to below atmospheric. This assists in sucking the mouldable material into the mould cavity and in preventing air being trapped which would result in air pockets and hence possibly depressions in the finished article. In FIG. 16 a suction passage 390 is shown leading into the mould cavity. The other embodiments shown in the drawings can also have suction passages for evacuating the mould cavities.

In the embodiments described the plunger moves with respect to the remaining parts of the apparatus to displace the mouldable material into the holding cavity. However, should it be desired to do so, the plunger can be held static and the remainder of the apparatus moved with respect to the plunger. Hence the mould cavity advances with respect to the static plunger until the front face of the plunger is properly positioned with respect to the remainder of the bounding surface of the mould cavity. The mould retracts from the plunger before opening.

What is claimed is:

1. Moulding apparatus comprising means for feeding a stream of mouldable material into a holding cavity through a feed opening in the bounding wall of said cavity until a charge of predetermined volume is in said cavity, a piston having a forward position and a retracted position, a face of the piston forming part of said bounding wall of said holding cavity whilst the piston is in said retracted position, an opening in the bounding wall of said holding cavity for placing said holding cavity in communication with a moulding cavity, means for advancing said piston through said holding cavity from said retracted position to said forward position thereby to force said charge out of the holding cavity through said opening, said holding cavity being of constant cross section between the retracted position of the piston and said opening and the front face of the piston being of the same cross-section as said holding cavity and said opening, said face, when the piston has in use been displaced to said forward position, forming part of the bounding wall of the moulding cavity into which the mouldable material has been discharged, and means for adjusting the position to which the piston retracts thereby to enable the volume of said holding cavity to be varied.

2. A method of moulding an article which method comprises feeding a stream of mouldable material into a holding cavity through a feed opening in the bounding wall of said cavity until a charge of a predetermined volume is in the cavity, advancing a piston, a face of which forms part of said bounding wall of said holding cavity, from a retracted position to a forward position to discharge said mouldable material from the holding cavity into a moulding cavity through a discharge opening which places said holding cavity in communication with the moulding cavity, said face, whilst said piston is in the forward position, being part of the bounding surface of the mould cavity, and said holding cavity being of constant cross-section between the position to which the piston retracts and said discharge opening, said front face of the piston being of the same cross-section as the constant cross section of the holding cavity, characterized by the steps of placing said holding cavity in communication with a chamber of fixed volume whilst the piston is retracting within said chamber so that the motion of the piston displaces material into said holding cavity from said chamber, closing-off the holding cavity from the chamber, advancing the piston to said forward position, re-filling said chamber with mouldable material, re-establishing communication between said holding cavity and said chamber and then retracting the piston to commence the next cycle.

3. Moulding apparatus comprising means for feeding a stream of mouldable material into a holding cavity through a feed opening in the bounding wall of said cavity until a charge of predetermined volume is in said cavity, a piston having a forward position and a retracted position, a face of the piston forming part of said bounding wall of said holding cavity whilst the piston is in said retracted position, an opening in the bounding wall of said holding cavity for placing said holding cavity in communication with a moulding cavity, means for advancing said piston through said holding cavity from said retracted position to said forward position thereby to force said charge out of the holding cavity through said opening, said holding cavity being of constant cross section between the retracted position of the piston and said opening and the front face of the piston being of the same cross-section as said holding cavity and said opening, said face, when the piston has in use been displaced to said forward position, forming part of the bounding wall of the moulding cavity into which the mouldable material has been discharged, characterized in that said piston moves within a chamber of fixed volume and, whilst retracting, displaces mouldable material from one part of said chamber into a further part of said chamber, said holding cavity constituting said further part of the chamber, the apparatus being further characterized by means for closing-off said parts of the chamber from one another whilst the piston is advancing, and placing said parts in communication with one another whilst the piston is retracting.

4. A method of moulding in which the movement of a reciprocating piston displaces a measured charge of material along a flow path terminating in a valve which valve, when open, places the flow path in communication with a barrel from which the material is forced into a mould cavity, the method being characterized in that the flow path is maintained full of mouldable material both whilst the piston is retracting and whilst the piston is advancing.

5. Apparatus comprising barrel, a piston, a screw in the barrel, means for rotating the screw to plasticize mouldable material, a first melt chamber in which plasticized material is accumulated, the first melt chamber being on the same side of the piston as the screw, a flow path through the piston, a second melt chamber on the opposite side of the piston to the first melt chamber, means for advancing said piston, a face of which forms part of said bounding wall of said second melt chamber, from a retracted position to a forward position to discharge said mouldable material from the second melt chamber into a moulding cavity through a discharge opening which places said second melt chamber in communication with the moulding cavity, said face, whilst said piston is in the forward position, being part of the bounding surface of the mould cavity, and said second melt chamber being of constant cross-section between the position to which the piston retracts and said discharge opening, said front face of the piston being of the same cross-section as the constant cross section of the second melt chamber.

6. Moulding apparatus comprising:
  (1) A mouldable material collecting chamber;
  (2) Means for feeding a stream of mouldable material into said collecting chamber;

(3) A holding cavity;

(4) A flow path which places said collecting chamber in communication with said holding cavity;

(5) A piston having a forward position and a retracted position, a face of said piston forming part of the bounding wall of said holding cavity and a further face of said piston forming part of said bounding wall of said collecting chamber;

(6) An opening in said bounding wall of said holding cavity for placing said holding cavity in communication with a moulding cavity; and (7) Means for advancing said piston through said holding cavity from said retracted position to said forward position and for retracting said piston (7) Means for advancing said piston through said holding cavity from said retracted position to said forward position and for retracting said piston through said holding cavity from said forward position to said retracted position, retraction of said piston causing the volume of said collecting chamber to decrease and the volume of said holding cavity to increase and advance of said piston causing the volume of said collecting chamber to increase and the volume of said holding cavity to decrease.

7. Moulding apparatus as claimed in claim 6, and including a multitude of holding cavities, there being pistons for displacing mouldable material from said holding cavities into a single mould cavity.

8. Moulding apparatus as claimed in claim 6, and including a multitude of holding cavities, there being pistons for displacing mouldable material from said holding cavities into respective mould cavities.

9. A method of moulding which comprises:

feeding a stream of mouldable material into a mouldable material collecting chamber having a bounding wall;

retracting a piston, one face of which forms a part of said bounding wall of said chamber, in a direction which reduces the volume of said chamber and forces mouldable material out of said chamber into a materials flow path leading to a holding cavity; and advancing said piston so that the volume of said chamber increases thereby permitting further mouldable material to enter said chamber and causing the mouldable material in said holding cavity to be displaced from said holding cavity into a moulding cavity.

10. A method of moulding as claimed in claim 9 and including feeding mouldable material to a multitude of holding cavities, and displacing said material from said holding cavities into a single mould cavity.

11. A method of moulding as claimed in claim 9 and including feeding mouldable material to a multitude of holding cavities, and displacing said material from said holding cavities into respective mould cavities.

12. Moulding apparatus as claimed in claim 6, wherein said first face of the piston, in the forward position of the piston, forms part of the bounding wall of said moulding cavity.

13. Moulding apparatus as claimed in claim 6, wherein said holding cavity is of constant cross section between the retracted position of the piston and said opening and the front face of the piston is of the same cross-section as said holding cavity and said opening, said face, when the piston has in use been displaced to said forward position, forming part of the bounding wall of the moulding cavity into which the mouldable material has been discharged.

* * * * *